US012604797B2

(12) United States Patent
Wagers et al.

(10) Patent No.: US 12,604,797 B2
(45) Date of Patent: Apr. 21, 2026

(54) SPRAYER BOOM RECIRCULATION AND MIXING SYSTEMS AND METHODS FOR SAME

(71) Applicant: Raven Industries, Inc., Sioux Falls, SD (US)

(72) Inventors: Jesse Lee Wagers, Harrisburg, SD (US); Nicholas O. Michael, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 769 days.

(21) Appl. No.: 17/293,843

(22) PCT Filed: Nov. 14, 2019

(86) PCT No.: PCT/US2019/061563
§ 371 (c)(1),
(2) Date: May 13, 2021

(87) PCT Pub. No.: WO2020/102600
PCT Pub. Date: May 22, 2020

(65) Prior Publication Data
US 2022/0007569 A1    Jan. 13, 2022

Related U.S. Application Data

(60) Provisional application No. 62/767,280, filed on Nov. 14, 2018.

(51) Int. Cl.
*A01C 23/04* (2006.01)
*A01M 7/00* (2006.01)
(Continued)

(52) U.S. Cl.
CPC ......... *A01C 23/047* (2013.01); *A01M 7/0042* (2013.01); *A01M 7/0071* (2013.01);
(Continued)

(58) Field of Classification Search
CPC ..... A01C 23/047; A01C 23/008; A01C 23/02; A01C 23/007; A01C 23/042;
(Continued)

(56) References Cited

U.S. PATENT DOCUMENTS 4,202,498 A    5/1980  Lestradet
5,050,995 A    9/1991  Lucore, II
(Continued)

FOREIGN PATENT DOCUMENTS

AU    2019381724    5/2023
CA    3119970 C    1/2024
(Continued)

OTHER PUBLICATIONS

"International Application Serial No. PCT/US2019/061563, International Preliminary Report on Patentability mailed May 27, 2021", 6 pgs.
(Continued)

*Primary Examiner* — Arthur O. Hall
*Assistant Examiner* — Juan C Barrera
(74) *Attorney, Agent, or Firm* — Schwegman Lundberg & Woessner, P.A.

(57) ABSTRACT

A product dispensing system includes at least one recirculation network configured for communication with a system pump. The at least one recirculation network includes at least one sprayer boom tube and a plurality of product dispensers distributed along the at least one sprayer boom tube. A network pump is in communication with the at least one sprayer boom tube. The at least one recirculation network includes a dispensing configuration and a recirculation configuration. In the dispensing configuration the recirculation network is configured for communication with a supply tank and an agricultural product reservoir. In the recirculation configuration the recirculation network is iso-
(Continued)

lated from the supply tank and the agricultural product reservoir, and the recirculation network includes a recirculation loop continuously extending through the network pump and the at least one sprayer boom tube.

25 Claims, 11 Drawing Sheets

(51) Int. Cl.
    *B05B 3/12*         (2006.01)
    *B05B 15/52*      (2018.01)
    *B05B 15/58*      (2018.01)

(52) U.S. Cl.
    CPC ................ *B05B 3/12* (2013.01); *B05B 15/52* (2018.02); *B05B 15/58* (2018.02)

(58) Field of Classification Search
    CPC .. A01M 7/0042; A01M 7/005; A01M 7/0071; A01M 7/0092; A01M 7/0089; B05B 15/52; B05B 15/58; B05B 3/12; A01G 25/16; A01G 25/09; A01G 25/00; A01G 25/162
    USPC ........................................... 239/11, 159–170
    See application file for complete search history.

(56)              References Cited

U.S. PATENT DOCUMENTS

| | | | |
|---|---|---|---|
| 5,609,417 | A | 3/1997 | Otte |
| 10,828,655 | B2 | 11/2020 | Dunkel et al. |
| 11,759,805 | B2 | 9/2023 | Klemann et al. |
| 2006/0086296 | A1 | 4/2006 | Wichmann |
| 2006/0093536 | A1 | 5/2006 | Selby |
| 2011/0240143 | A1* | 10/2011 | Lang ................... F16L 55/1108 137/561 A |
| 2012/0241533 | A1 | 9/2012 | Moeller et al. |
| 2014/0252111 | A1 | 9/2014 | Michael et al. |
| 2014/0284400 | A1 | 9/2014 | Hebbert et al. |
| 2016/0120118 | A1 | 5/2016 | Bouten et al. |
| 2017/0006852 | A1* | 1/2017 | Engelbrecht ........ A01M 7/0089 |
| 2018/0369851 | A1 | 12/2018 | Engelbrecht et al. |
| 2019/0009285 | A1 | 1/2019 | Zimmerman et al. |
| 2020/0113171 | A1 | 4/2020 | Davis et al. |
| 2020/0216275 | A1 | 7/2020 | Welte et al. |
| 2021/0219538 | A1 | 7/2021 | Krosschell et al. |
| 2021/0321603 | A1 | 10/2021 | Luck et al. |
| 2021/0323015 | A1 | 10/2021 | Harmon et al. |
| 2021/0378227 | A1 | 12/2021 | Crinklaw et al. |
| 2022/0117212 | A1 | 4/2022 | Ras |
| 2024/0109094 | A1 | 4/2024 | Michael et al. |

FOREIGN PATENT DOCUMENTS

| | | | | | |
|---|---|---|---|---|---|
| DE | 102017220002 | A1 | 5/2019 | | |
| EP | 1294228 | A1 | 3/2003 | | |
| EP | 2107865 | | 7/2017 | | |
| EP | 2617286 | B1 | 7/2018 | | |
| EP | 3880370 | A2 | 9/2021 | | |
| FR | 3003187 | A1 | 9/2014 | | |
| FR | 3003187 | B1 | 5/2016 | | |
| GB | 2423227 | | 8/2006 | | |
| WO | 2001095714 | | 12/2001 | | |
| WO | WO-0195714 | A1 | 12/2001 | | |
| WO | WO-2017168227 | A1 | 10/2017 | | |
| WO | WO-2018129376 | A2 * | 7/2018 | ........... | A01M 21/02 |
| WO | WO-2020102600 | A3 | 5/2020 | | |
| WO | 2024076646 | | 4/2024 | | |

OTHER PUBLICATIONS

"European Application Serial No. 19885971.2, Response filed Jan. 5, 2022 to Office Action mailed Jun. 25, 2021", 19 pgs.
"Australian Application Serial No. 2019381724, First Examination Report mailed Mar. 9, 2022", 2 pgs.
"Australian Application Serial No. 2022204936, Response filed Feb. 20, 2024 to First Examination Report mailed Oct. 19, 2023", 17 pgs.
"International Application Serial No. PCT/US2023/034485, International Search Report mailed Feb. 2, 2024", 5 pgs.
"International Application Serial No. PCT/US2023/034485, Written Opinion mailed Feb. 2, 2024", 8 pgs.
"International Application Serial No. PCT/US2019/061563, International Search Report mailed Jan. 17, 2020", 2 pgs.
"International Application Serial No. PCT/US2019/061563, Written Opinion mailed Jan. 17, 2020", 4 pgs.
"European Application Serial No. 19885971.2, Response filed Jan. 31, 2023 to Extended European Search Report mailed Jul. 4, 2022", 13 pgs.
"Canadian Application Serial No. 3,119,970, Response filed Apr. 28, 2023 to Examiner's Rule 86(2), Report mailed Dec. 29, 2022", 11 pgs.
"Australian Application Serial No. 2022204936, First Examination Report mailed Oct. 19, 2023", 4 pgs.
"Canadian Application Serial No. 3,119,970, Office Action mailed Mar. 31, 2022", 8 pgs.
"European Application Serial No. 19885971.2, Extended European Search Report mailed Jul. 4, 2022", 8 pgs.
"Australian Application Serial No. 2019381724, Response filed Jul. 6, 2022 to First Examination Report mailed Mar. 9, 2022", 1 pg.
"Canadian Application Serial No. 3,119,970, Response filed Jul. 28, 2022 to Office Action mailed Mar. 31, 2022", 155 pgs.
"Australian Application Serial No. 2019381724, Subsequent Examiners Report mailed Aug. 3, 2022", 3 pgs.
"Canadian Application Serial No. 3,119,970, Examiner's Rule 86(2), Report mailed Dec. 29, 2022, 5 pgs.", 5 pgs.
"Australian Application Serial No. 2019381724, Response filed Dec. 13, 2022 to Subsequent Examiners Report mailed Aug. 3, 2022", 12 pgs.
"Australian Application Serial No. 2022204936, Subsequent Examination Report mailed Apr. 12, 2024", 3 pgs.
"Australian Application Serial No. 2022204936, Response filed Oct. 9, 2024 to Subsequent Examination Report mailed Apr. 12, 2024", 24 pgs.
"European Application Serial No. 19885971.2, Communication Pursuant to Article 94(3) EPC mailed Aug. 26, 2024", 6 pgs.
"U.S. Appl. No. 18/481,181, Response filed Sep. 18, 2025 to Restriction Requirement mailed Aug. 26, 2025", 8 pgs.
"U.S. Appl. No. 18/481,181, Restriction Requirement mailed Aug. 26, 2025", 9 pgs.
"International Application Serial No. PCT/US2023/034485, International Preliminary Report on Patentability mailed Apr. 17, 2025", 10 pgs.
"U.S. Appl. No. 18/481,181, Non Final Office Action mailed Nov. 6, 2025", 18 pgs.
"European Application Serial No. 25185314.9, Extended European Search Report mailed Nov. 20, 2025", 14 pgs.
"European Application Serial No. 23801100.1, Response to Communication Pursuant to Rules 161 and 162 EPC filed Nov. 28, 2025", 25 pgs.
"European Application Serial No. 19885971.2, Communication Pursuant to Article 943 EPC mailed Jan. 8, 2026", 8 pages.
"U.S. Appl. No. 18/481,181, Response filed Mar. 6, 2026 to Non Final Office Action mailed Nov. 6, 2025", 15 pages.

* cited by examiner

SPRAYER BOOM RECIRCULATION AND MIXING SYSTEMS AND METHODS FOR SAME

CLAIM OF PRIORITY

This patent application is a U.S. National Stage filing from PCT Application No. PCT/US2019/061563, filed on Nov. 14, 2019, which claims the benefit of priority of Wagers et al. U.S. Provisional Patent Application Ser. No. 62/767,280, entitled "SPRAYER BOOM RECIRCULATION AND MIXING SYSTEMS AND METHODS FOR SAME" filed on Nov. 14, 2018, which applications are hereby incorporated by reference herein in their entirety.

COPYRIGHT NOTICE

TECHNICAL FIELD

This document pertains generally, but not by way of limitation, to agricultural sprayers and application of agricultural products.

BACKGROUND

Agricultural sprayers transport and dispense mixed solutions of agricultural products to crops through a plurality of spray nozzles. In some examples, agricultural sprayers include a supply tank including a carrier fluid mixed with one or more agricultural products (e.g., fertilizer, herbicide, pesticide or the like) to provide an agricultural solution. A system pump draws from the supply tank and pumps the agricultural solution into sprayer boom tubes (e.g., provided along booms extending from the vehicle). The agricultural solution is pumped from a proximal end of each boom tube to an opposed distal end and dispensed from spray nozzles provided along the length of the booms between the ends. Optionally, the sprayer plumbing is configured to recirculate the agricultural solution. The recirculation loop includes one or more valves such as three-way valves, that open a complete circuit between the supply tank having the mixed solution, the system pump, the sprayer boom tubes, and returns to the supply tank to complete the loop. The system pump is operated to recirculate the agricultural solution through this loop, for instance to minimize settling of the agricultural product relative to the carrier fluid.

In other examples, sprayers include a supply tank having the carrier fluid, and one or more separate reservoirs including agricultural products. The one or more agricultural products are mixed with the carrier fluid onboard the sprayer vehicle. The system pump moves the mixed agricultural solution into the boom tubes at proximal ends adjacent to the vehicle, and the agricultural solution is pumped from the proximal ends to the opposed distal ends of the boom tubes for dispensing through spray nozzles.

OVERVIEW

The present inventors have recognized, among other things, that a problem to be solved includes providing localized mixing of agricultural products relative to product dispensers (e.g., spray nozzles, nozzle arrays or the like) while at the same time including a recirculation system that does not include a supply tank, such as a carrier fluid supply tank, and enhances mixing of the agricultural product with the carrier fluid. In example sprayers with supply tanks having agricultural products premixed with the carrier solution the localized mixing and control of agricultural product concentration is not available. Accordingly, the dispensed agricultural solution provides a specified concentration delivered from proximal ends of sprayer boom tubes to opposed distal ends of the boom tubes. Further, recirculation of the fluid to minimize settling, coagulation or the like is a system wide loop extending from the supply tank, system pump, tubing to each of the sprayer boom tubes and back to the supply tank. The system pump accordingly recirculates the entire system. In example cleaning configurations an extensive volume of water is used to clean the system wide loop of the agricultural product including (the 100 gallon or more) supply tank.

In other example sprayers including a separated supply tank for the carrier fluid and one or more agricultural products the components are mixed and distributed to each of the sprayer boom tubes with the system pump. The mixed agricultural solution is delivered from the proximal ends of the sprayer boom tubes to the respective distal ends for dispensing from spray nozzles therebetween. In this example, the concentration of the agricultural solution is controlled proximate the sprayer vehicle, and the mixed solution is delivered by the system pump to proximal ends of the sprayer boom tubes. The solution is then pumped from the proximal ends to the distal ends for application. Recirculation with a mixing system is not conducted with the system pump. Because the system pump draws from the supply tank (usually including water as the carrier fluid) recirculation would contaminate the carrier fluid by introducing the mixed agricultural solution between the system pump and the distal ends of the sprayer boom tubes.

The present subject matter provides a solution to these problems by providing recirculation networks in the sprayer boom tubes that isolate the agricultural solution from each of the supply tank for the carrier fluid and the and the agricultural product reservoirs including the agricultural products. Instead, the recirculation networks recirculate the agricultural product solution proximate to the sprayer booms, for instance in the sprayer boom tubes, without communication to the supply tank or agricultural product reservoirs. The recirculation networks include recirculation pumps (e.g., separate from system pumps) that recirculate the agricultural product solution locally relative to the sprayer booms. The concentration of the agricultural product in solution is accordingly maintained locally relative to the sprayer booms without communicating the agricultural solution to upstream components such as the system pump, supply tank, agricultural product reservoirs or the like.

The recirculation networks also enhance mixing of the agricultural products with the carrier fluid locally relative to one or more product dispensers, such as spray nozzles, spray nozzle arrays or the like. For example, the recirculation networks described herein include capillary bridges between portions of the sprayer boom tubes that facilitate short circuited communication of the agricultural solution between portions of the sprayer boom tubes. Recirculation of the agricultural solution with an updated concentration (e.g., based on injection control from the agricultural product reservoirs to the carrier fluid) is rapidly performed through delivery of the solution to the sprayer boom tubes and distributing the solution having the updated concentration throughout the sprayer boom tubes with the capillary bridges of the recirculation network. The capillary bridges interconnect proximate and remote portions of the sprayer boom tubes to provide multi-dimensional communication (along the tube length as well as jumping between locations) to accelerate distribution of the agricultural product solution having an updated concentration to the remote portions and locations between the proximal and remote portions. Accordingly, rapid changes in agricultural product concentration are achieved throughout the sprayer boom tubes by way of the recirculation network without delays otherwise experienced with linear delivery of the agricultural solution from proximal ends to opposed distal ends.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
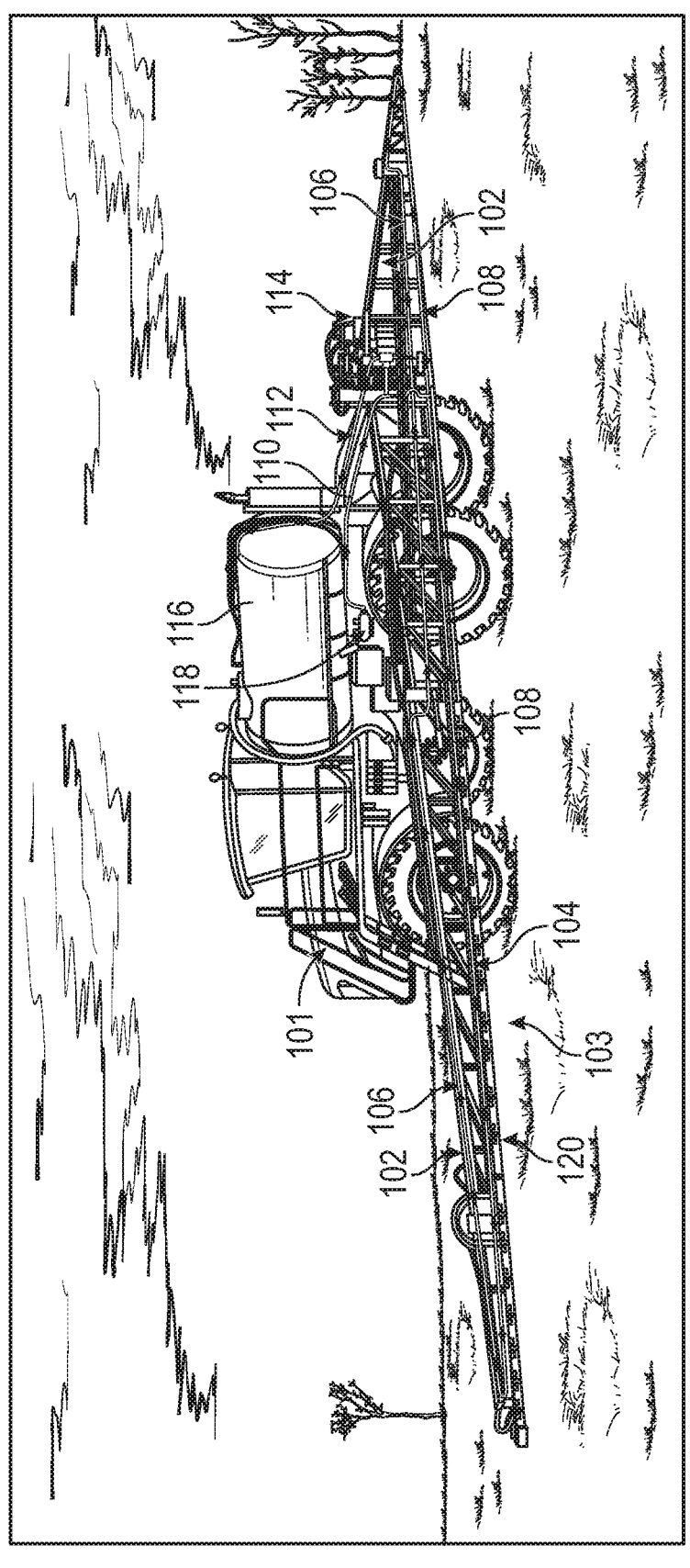
FIG. 1 is a perspective view of one example of an agricultural sprayer.

FIG. 1 is a perspective view of one example of agricultural sprayer 100. The sprayer 100 includes a chassis 101 that carries a supply tank 116 of an agricultural solution including a carrier fluid and mixed agricultural product including, but not limited to, fertilizers, herbicides, pesticides or the like. Optionally, the supply tank 116 stores the carrier fluid, such as water, and a separate agricultural product reservoir (see FIG. 2) provides the agricultural product for metered administration to the carrier fluid prior to delivery to the sprayer booms 102.

The agricultural sprayer 100 includes a spraying system extending from the supply tank 116 to one or more product dispensers 120 along sprayer booms 102. The sprayer booms 102 extend from the chassis 101 and each include respective sprayer boom tubes 104. As shown in the schematic illustration overlaying the sprayer 100 the supply tank 116 includes a main line 110 and a system pump 118 along the main line 110. The main line 110 is in communication with the sprayer boom tubes 104. Operation of the system pump 118 delivers the mixed agricultural solution to the sprayer boom tubes for delivery through one or more product dispensers 120. The product dispensers 120 include, but are not limited to, one or more nozzles, arrays of nozzles, boom sections or the like. As further shown in FIG. 1, the sprayer boom tubes 104 include proximal and distal portions 106, 108. For example, the proximal portions 106 extend along the sprayer booms 102 toward the respective ends of the booms 102 remote from the chassis 101. The distal portions 108 of the sprayer boom tubes 104 extend from the ends of the booms 102 toward the chassis 101. In this example, the product dispensers 120 are provided along the distal portions 108.

In spraying operation a control valve 114 (e.g., a three way control valve or the like) is interposed between the main line 110, the sprayer boom tubes 104 and a return line is configured to deliver the pumped agricultural solution from the supply tank 116 to at least one of the sprayer boom tubes 104 (e.g., the proximal portion 106 of the right boom tube 104). In the view shown in FIG. 1, the main line 110 is also in communication with the opposed (left) sprayer boom tube 104. The agricultural solution is delivered from the supply tank 116 by the system pump 118 and to each of the sprayer boom tubes 104 by way of the main line 110 and, in this example, the control valve 114. The proximal portions 106 of the sprayer boom tubes 104 deliver the agricultural solution to the ends of the sprayer booms 102, and the agricultural solution returns along the distal portions 108 of the sprayer boom tubes 104 for dispensing in the one or more product dispensers 120.

In some examples, recirculation of the fluids through the sprayer system 103 is specified. For instance, during idling of the agricultural sprayer 100 the agricultural products in the carrier fluid of the agricultural solution settle, agglomerate or the like. Recirculation of the agricultural solution mixes the agricultural solution and accordingly redistributes the products into the carrier fluid. In other examples, cleaning of the sprayer system 103 is specified, for instance to remove residue of a first agricultural product for a second agricultural product. Where recirculation is specified the sprayer system 103 is reconfigured relative to the spraying operation.

In recirculation operation the control valve 114 is operated to interconnect the return line 112 (extending to the supply tank 116) with the remainder of the sprayer system 103. For example, a three way valve is oriented to open communication to the return line 112 while isolating the corresponding portion of the sprayer boom tube 104, in this example the right tube, from agricultural solution from the main line 116. While recirculating the system pump 118 continues to pump the agricultural solution from the supply tank 116 to one of the sprayer boom tubes 104 (e.g., the left tube in this example). The solution is delivered in a linear manner along the proximal portion 106 to the end of the sprayer boom 102, and from the end along the distal portion 108 toward the chassis 101. Optionally, the product dispensers 120 are closed if mixing of the solution is specified (e.g., to remix settled agricultural products). In another example, the product dispensers 120 are opened (including partially opened) to clean the sprayer system 103 by flushing residual agricultural product from the dispensers.

The agricultural solution continues from the distal portion 108 of the first sprayer boom tube 104 (the sprayer boom tube associated with the left sprayer boom 102 in this example) to the distal portion 108 of the second sprayer boom tube 104 (e.g., the tube associated with the right sprayer boom 102). The recirculating agricultural solution travels along the distal portion 108 of the sprayer boom tube 104 and passes through the proximal portion 106 of the boom tube 104 toward the chassis 101. The reoriented control valve 114, for instance a three way valve 114, communicates the recirculated agricultural solution to the return line 112 for delivery to the supply tank 116 to complete the circuit from the supply tank 116 to and through the sprayer boom tubes 104 and back to the supply tank 116. When spraying operation is specified the control valve 114 is operated to close communication with the return line 112 and thereby reinitiate communication of the agricultural solution from the supply tank 116 to the proximal portions 106 of the sprayer boom tubes 104 and distribution through the product dispensers 120 along the distal portions 108 of the tubes 104.

The recirculation operation described in FIG. 1 is used with agricultural solutions having a specified, constant, mix or concentration of products because the solution is recirculated to the supply tank 116 having the agricultural solution. Recirculation in this manner, if used with a supply tank 116 housing a carrier fluid (e.g., water) and separate agricultural product reservoirs would 'spoil' the carrier fluid by introducing the mixed agricultural solution into the carrier fluid within the supply tank 116.

In other agricultural sprayers 100 the spraying system includes agricultural product reservoirs having one or more agricultural products that are injected to the carrier fluid to modulate concentrations and compositions of the agricultural solution for high resolution spraying operations. The supply tank 116 having the carrier fluid alone frustrates ongoing control of concentration or composition with recirculation because recirculation of the agricultural solution including the injected products in the carrier solution to the supply tank 116 spoils (e.g., intermixes) the carrier fluid for ongoing (future) administration of agricultural products.

Figure 2:
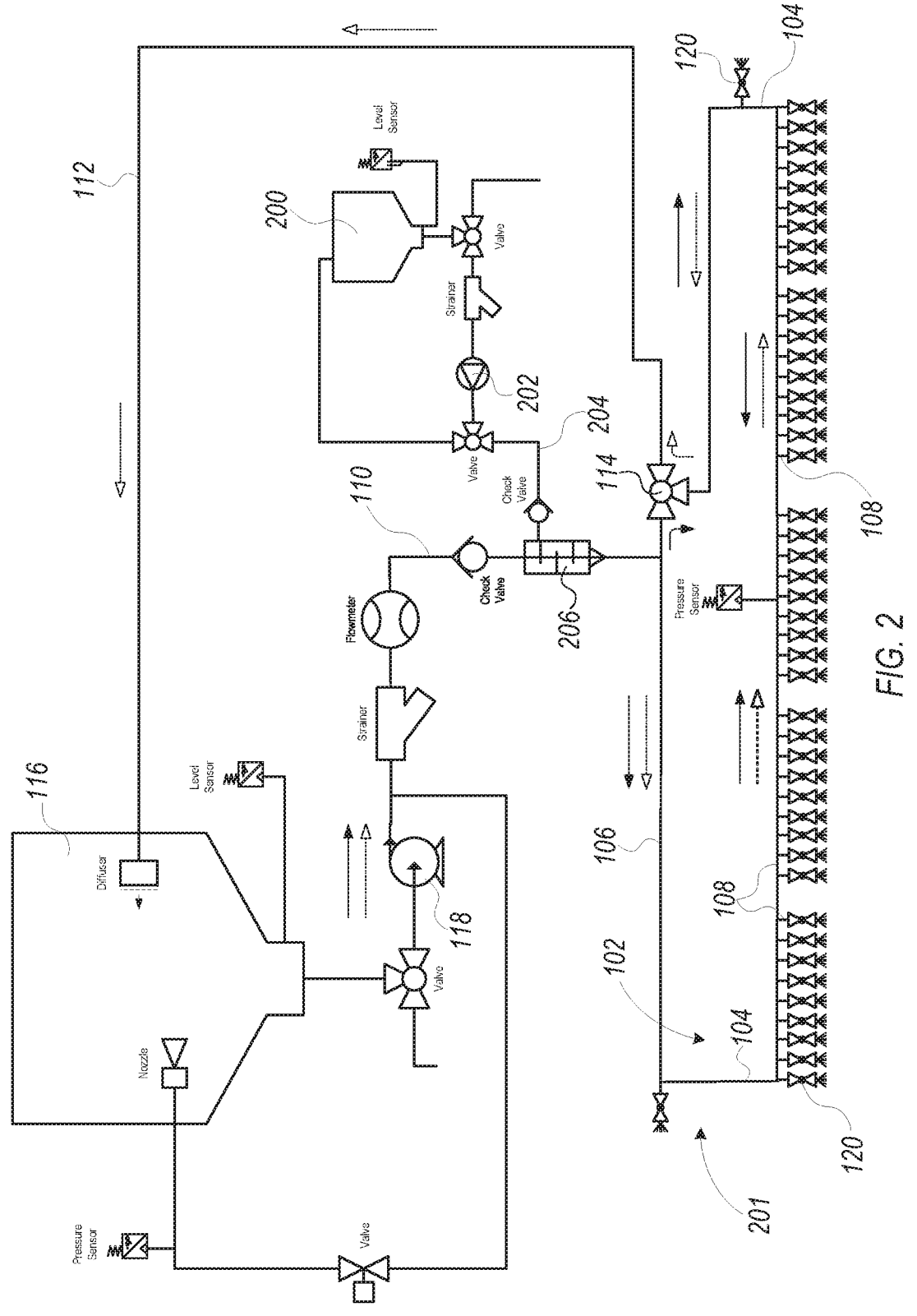
FIG. 2 is a schematic view of one example of a spraying system.

FIG. 2 is a schematic view of one example of a spraying system 201 including a supply tank 116 for a carrier fluid and a separate agricultural product reservoir 200 including an agricultural product for metered administration to the carrier fluid (e.g., to control one or more composition and concentration of the agricultural solution). The spraying system 201 interconnects the supply tank 116 carrier fluid with the agricultural product from the agricultural product reservoir 200 at a mixer 206 (e.g., a turbulator), in this example provided along the main line 110. An injection pump 202 (e.g., a metering pump, such as a diaphragm pump, rotary pump or the like) delivers the agricultural product form the reservoir 200 through an injection line 204 to the mixer 206. The injection pump 202 administers the agricultural product to the carrier fluid in a controlled manner, for instance based on a specified concentration or composition of the agricultural product. Optionally, concentration sensors downstream of the mixer 206 measure the concentration of the agricultural product. The measured concentration is used in a controller to provide feedback based control for the concentration of the agricultural product. The spraying system 210 is thereby configured to modulate the concentration (and composition) of the agricultural solution in an ongoing manner, for instance accordingly to specified changes in the concentration (or composition) based on one or more of, but not limited to, field prescriptions, discrete zone based prescriptions within the field, operator control or the like.

As an example, both spraying operation and recirculating operation as described in FIG. 1 are illustrated in FIG. 2. Spraying operation is noted with solid arrows beginning at the supply tank 116 and extending through the sprayer boom tubes 104. Conversely, recirculating operation is shown with broken line arrows.

Spraying operation corresponds to the arrangement previously described relative to FIG. 1. Carrier fluid is delivered from the supply tank 116 through the main line 110 by the system pump 118. As shown in FIG. 2, the main line 110 extends through a mixer 206. The injection line 204 extends to the mixer 206, and metered agricultural product is administered (e.g., at one or more specified concentrations) by the injection pump 202 to the carrier fluid at the mixer 206. The agricultural product and the carrier fluid are mixed with the mixer 206 and form an agricultural solution having a specified concentration of the agricultural product. The control valve 114 is oriented according to the sprayer operation and accordingly isolates the return line 112 from the remainder of the spraying system 201. The mixed agricultural solution is delivered to each of the proximal portions 106 of the respective sprayer boom tubes 104. The solution travels linearly to the ends of the sprayer booms 102 and enters the distal portions of the sprayer boom tubes 104. The agricultural solution is distributed from the sprayer boom tubes 104 with the product dispensers 120 including, but not limited to, one or more nozzles, arrays of nozzles, boom sections or the like. The agricultural solution having the specified concentration thereby follows a linear path beginning at the supply tank 116 and the agricultural product reservoir 200, extending along the main line 110, and through the proximal portions 106 to the distal portions 108 and the associated product dispensers 120 of the sprayer boom tubes 104.

The linear path of the agricultural solution, for instance from the mixer 206, through the proximal portions 106 of the sprayer boom tubes 104, and to the distal portions 108 slows the administration of agricultural solutions having updated concentrations. For instance, as concentration (and including composition) is changed at the mixer 206 the updated agricultural solution travels through the sprayer boom tubes 104 from the proximal portion 106 to the distal portion 108 prior to distribution with the specified concentration. In some examples, agricultural solutions having the specified concentration are delivered some time after the product dispensers 120 have passed the associated crops or locations prescribed to receive the specified concentration of agricultural product.

An example of a recirculation operation is shown for the spraying system 201 in FIG. 2 by the broken line arrows to illustrate the 'spoiling' of the carrier fluid in the supply tank 116 with the recirculating agricultural solution having the agricultural product therein. When recirculation is specified the control valve 114 is operated and isolates the proximal portion 106 of the right sprayer boom tube 104 from direct (including near direct) communication with the main line 110. The control valve 114 instead opens the proximal portion 106 of the right sprayer boom tube 104 for communication with the return line 112 and the supply tank 116. The agricultural solution mixed at the mixer 206 is delivered to the sprayer booms 102, in this example to the left sprayer boom tube 104. The agricultural solution travels through the proximal portion 106 to the end of the respective sprayer boom 102. The agricultural solution then travels through the distal portion 108 of the left sprayer boom tube 104. As previously described, depending on the manner of recirculation specified (e.g., cleaning or remixing of settled product) the product dispensers 120 are open or closed. The agricultural solution continues into the interconnected distal portion 108 of the right sprayer boom tube 104 and travels to the end of the associated (right) sprayer boom 102. The proximal portion 106 receives the agricultural solution and the solution is directed by the control valve 114 to the return line 112 for return to the supply tank 116. The returned agricultural solution, if delivered to the supply tank 116, mixes with the carrier fluid (e.g., water) and thereby 'spoils' the otherwise clean carrier fluid with the agricultural product. Ongoing control of the concentration (including composition) of the agricultural product with the agricultural product reservoir 200 and the injection pump 202 is thereby frustrated as the carrier fluid from the supply tank 116 now includes a varying concentration of the agricultural product. Spoiling of the carrier fluid is further exaggerated in spraying systems including multiple agricultural products that are separately injected in a controlled and dynamic manner to the carrier fluid.

Figure 3A:
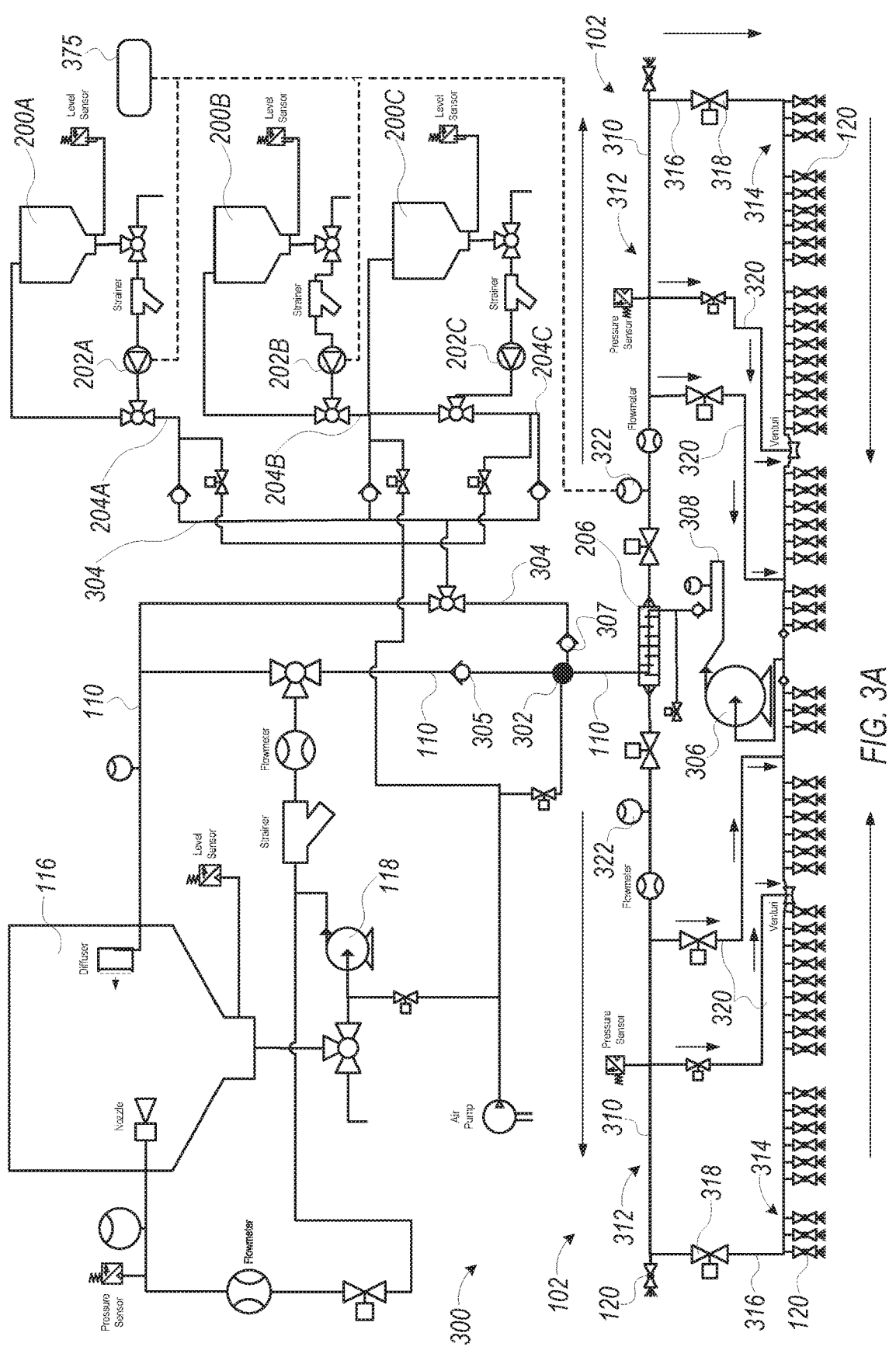
FIG. 3A is a schematic view of one example of a spraying system including capillary bridges.

FIG. 3A is a schematic diagram of one example of a spraying system 300 (e.g., a product dispensing system) including one or more capillary bridges 320 coupled between portions of the sprayer boom tubes 310. As shown in FIG. 3A, the spraying system 300 includes components similar to components in other spraying systems described herein. For instance, the system 300 includes a supply tank 116 configured to hold a quantity of carrier fluid such as water therein as well as a system pump 118 configured to deliver the carrier fluid for mixing with one or more agricultural products. As further shown in FIG. 3A, the spraying system 300 includes a plurality of agricultural product reservoirs 200A, B, C. In this example, three agricultural product reservoirs are provided. In other examples, one or more agricultural product reservoirs are provided for controlled injection of various agricultural products to the carrier fluid, for instance, at the juncture 302.

Referring again to FIG. 3A, each of the agricultural product reservoirs 200A, B, C are associated with corresponding respective injection pumps 202A, B, C. Each of the injection pumps are in communication with the remainder of the spraying system 300 such as the main line 110 extending from the supply tank 116 through one or more component injection lines 204A, B, C. As shown in FIG. 3A, each of the injection lines 204A-C, in this example, deliver the associated agricultural product to an injection main line 304 and the injection main line 304 is coupled with the main line 110 at the juncture 302. In this example, the juncture 302 is upstream relative to a mixer 206, such as a turbulator, proximate to the sprayer booms 102. As further shown in FIG. 3A, each of the main line 110 and the injection main line 304 include corresponding check valves 305, 307 to facilitate the delivery of the associated carrier fluid, agricultural products or the like to the juncture 302 while preventing backflow of the fluid, for instance during localized recirculation within the recirculation network described herein. The check valves 305, 307 are, in one example, components of the recirculation network described herein and prevent backflow of the recirculated fluid to remote portions of the spraying system 300 including the main line 110, supply tank 116 as well as the agricultural product reservoirs 200A-C. Instead, the check valves 305, 307 in combination with the other components of the recirculation network (also described as a recirculation loop herein) ensure the agricultural solution within the sprayer boom tubes 310 is localized and recirculated therein without communication to other remote components of the spraying system 300. The isolation of the supply tank 116 as well as the agricultural product reservoirs 200A-C from recirculation within the sprayer boom tubes 310 ensures agricultural solution already having one or more agricultural products therein is not administered to the supply tank 116 or the product reservoirs 200A-C thereby avoiding spoiling (e.g., intermixing) of the carrier fluid or the agricultural products.

As further shown in FIG. 3A, the spraying system 300, in this example, includes opposed sprayer boom tubes 310, for instance, extending from the main line 110. In this example, each of the sprayer boom tubes 310 includes an associated proximal portion 312 and a distal portion 314. A boom return 316, for instance, at an end of each of the sprayer booms 102 interconnects the proximal portion 312 with the distal portion 314. As further shown in FIG. 3A, a return valve 318 is, in one example, included with the boom return 316 and is optionally used in combination with a section valve, for instance, associated with one or more of the capillary bridges 320 described herein to operate or remove from operation one or more portions of the sprayer boom tubes 310 (e.g., for instance, where limited operation of the spraying system 300 is specified).

Referring again to FIG. 3A, each of the sprayer boom tubes 310, in this example, extends from the proximal portion 312 to the distal portion 314. Product dispensers 120 including, but not limited to, one or more nozzles, arrays of nozzles, boom sections or the like are associated with each of the sprayer boom tubes 310. In the example shown in FIG. 3A, each of the distal portions 314 of the associated sprayer boom tubes 310 include product dispensers 120 there along.

The spraying system 300 further includes a recirculation bridge 308 extending from the distal portions 314 of the sprayer boom tubes 310, for instance, toward the proximal portions 312 of the boom tubes (e.g., proximate to the main line 110 and the mixer 206 shown in FIG. 3A). The recirculation bridge 308 further includes a network pump 306 configured to provide a flow of the agricultural solution (including a cleaning solution, water or the like in a cleaning configuration) through the sprayer boom tubes 310 in an isolated and local manner relative to the remainder of the spraying system 300. In another example, the network pump 306 is operated in tandem with the system pump 118, for instance, to provide step up or supplement pressurizing of the agricultural solution and enhance or assist with the delivery within the sprayer boom tubes 310.

As further shown, each of the sprayer boom tubes 310, in this example, include one or more capillary bridges 320 extending between the proximal and distal portions 312, 314 of the associated boom tubes 310. In the example shown in FIG. 3A, two capillary bridges 320 are provided for each of the sprayer boom tubes 310 and interconnect the associated proximal and distal portions 312, 314. The capillary bridges 320 provide a short circuit, shunt or bridge between the portions 312, 314 of the sprayer boom tubes 310 to facilitate distribution of changing agricultural solutions throughout the sprayer boom tube 310 linearly and non-linearly (e.g., multi-dimensionally, instead of along the tube passages alone). For instance, as previously described, agricultural solutions are modulated, for instance, at the juncture 302 with operation of the various injection pumps 202A-C to administer corresponding agricultural products having specified concentrations (e.g., including compositions) of the products. In other example spraying systems, these solutions are administered in a linear fashion, for instance, first through proximal portions of sprayer boom tubes and then to the distal portions and the associated product dispensers. In the example shown in FIG. 3A, each of the capillary bridges 320 provides a shunt or short circuit (e.g., fluid jumper or the like) that extends across the proximal and distal portions 312, 314 to immediately provide the updated concentration (including composition) of the agricultural solution to otherwise downstream components of the spraying system 300 including, but not limited to, product dispensers 120. The rapid introduction of the updated agricultural solution facilitates immediate or near immediate distribution of the agricultural solution having the updated concentration (including compositions) from the product dispensers with minimal delay otherwise present with linear delivery.

Figure 3B:
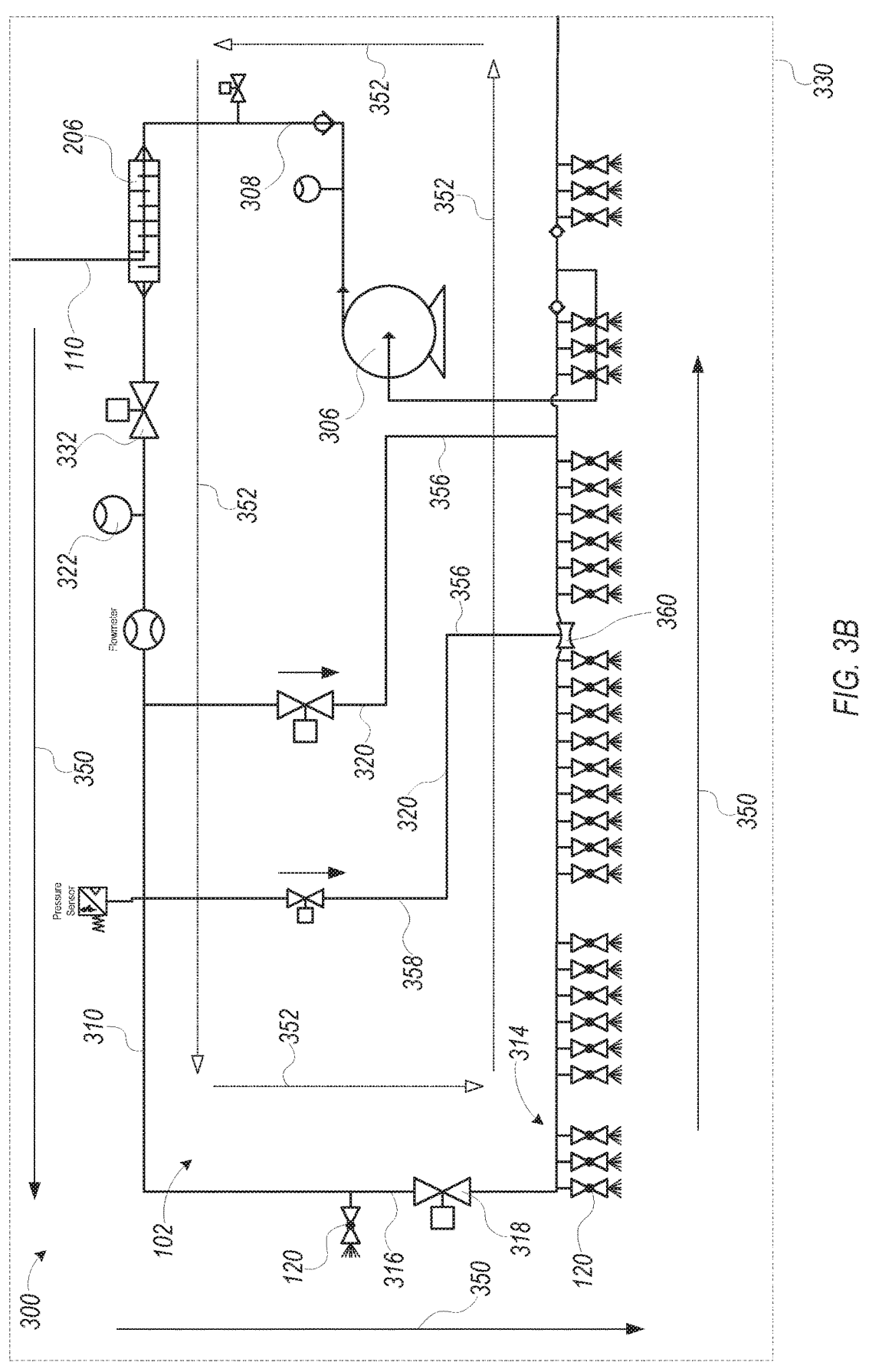
FIG. 3B is a detailed schematic view of a portion of the spraying system of FIG. 3A including a recirculation network.

As described herein and further shown in FIG. 3B, in one example, the sprayer boom tubes 320 include one or more different examples of capillary bridges 320. In one example, the capillary bridges 320 include venturi fittings configured to draw the agricultural solution from the proximal portion 312 into the distal portion 314, for instance, according to a pressure differential enhanced by the decreased throat profile of the venturi fitting relative to the (larger) tube profile of the distal portion 314. In another example, one or more valves, such as section valves or the like are operated according to one or more of constrained orifices, duty cycles (e.g., with reciprocating of a valve element such as solenoid element at a specified frequency) or the like to provide pulses of the updated agricultural solution across the sprayer boom tube 310, for instance, from the proximal portion 312 to the distal portion 314. As described herein, the pulsed distribution of the agricultural solution across the capillary bridges 320 with operation of the sectional valves allows for the maintenance of higher pressures in the proximal portion 312 relative to the distal portion 314 to ensure flow of the agricultural solution in a consistent fashion to the distal portion 314 of the associated product dispensers 120 while at the same time allowing for the pulsed introduction of the updated agricultural solution to the distal portions 314 of each of the sprayer boom tubes 310.

FIG. 3B is a detailed schematic view of a portion of the spraying system 300 previously shown and described in FIG. 3A. In this example, the left sprayer boom 102 shown in FIG. 3A is shown in detail. As previously described, the sprayer boom 102 includes a sprayer boom tube 310 including proximal and distal portions 312, 314 interconnected with a boom return 316 and associated return valve 318. The distal portion 314 of the sprayer boom tube 310 includes one or more product dispensers 120 (e.g., one or more nozzles, arrays of nozzles, boom sections or the like) configured to dispense an agricultural solution there from. In a dispensing configuration 350, for instance shown with solid arrows, in FIG. 3B, the agricultural solution is delivered from the main line 110 and has a specified concentration of one or more agricultural products. The agricultural solution is received at the mixer 206 and mixed (e.g., turbulated) to disperse the agricultural products. The agricultural solution is delivered along the proximal portion 312 of the sprayer boom tube 310, for instance, through one or more of control valves 332, concentration sensors 322, flow meters or the like. As shown in FIG. 3B, the agricultural solution passes through the boom return 316 proximate to an end of the sprayer boom 102 and is then delivered along the distal portion 314 of the sprayer boom tube 310 to the product dispensers 120 and toward the chassis or central portion of the spraying system 300. The agricultural solution delivered along the distal portion 314 is dispensed, for instance, through the one or more product dispensers 120 including nozzles, arrays of nozzles, boom sections or the like.

As shown in FIG. 3B, the sprayer boom tube 310, in this example, includes one or more capillary bridges 320 bridging the proximal and distal portions 312, 314. The agricultural solution delivered from the main line 110, for instance, along the proximal portion 312 is linearly distributed from the proximal portion 312 to the distal portion 314 as well as nonlinearly, for instance, across the capillary bridges 320. In one example, the capillary bridges 320 facilitate the jumping, short circuiting or shunting of the agricultural solution having an updated or changed concentration, composition or the like to the distal portion 314 to rapidly change the composition or concentration of the agricultural solution immediately or near immediately relative to application through the product dispensers 120.

In one example, for instance, during dispensing operation of the spraying system 300, the agricultural products from the reservoirs 200A, B, C are selectively added to the carrier fluid according to a specified prescription. The combination of the carrier fluid and the various agricultural products is delivered through the main line 110 to the sprayer boom tube 310. Optionally, one or more concentration sensors 322 are provided in line, for instance, with the proximal portion of the sprayer boom tube 312 to thereby facilitate the measurement of concentration (including composition) of the agricultural solution. In one example, a controller 375, control system or the like in communication with the concentration sensors 322 as well as the one or more of the injection pumps 202A-C is configured to control the concentration (as well as composition) of the agricultural products in the agricultural solution according to the specified prescription. These changes in the agricultural solution include decreasing, increasing, maintaining or halting the administration of one or more of the agricultural products to the juncture 302 shown in FIG. 3A. Accordingly, the controller 375 and the concentration sensors 322 facilitate the dispensing of the agricultural solution with a specified concentration (as well as composition). Further, the controller 375 and the concentration sensors 322 facilitate determining whether the system 300 is clean, for instance by determining whether the concentration of agricultural products within the sprayer boom tube 310 is within a specified (e.g., maximum) concentration threshold.

The capillary bridges 320 extending from the proximal portion 312 to the distal portion 314 of the sprayer boom tube 310 facilitate the rapid dissemination and distribution of the updated agricultural solution to downstream components of the sprayer boom tube 310 including the distal portion of the sprayer boom tube 314 and the associated product dispensers 120. Accordingly, as the specified concentration (including composition) of the agricultural solution changes the spraying system 300 shown in FIGS. 3A and 3B rapidly distributes the updated agricultural solution to the product dispensers 120.

Each of the capillary bridges 320 provides a short circuit, shunt or the like having a shorter distance according to the length of the capillary bridge 320 in comparison to the linear delivery of the agricultural solution, for instance, along the length of the proximal portion 312, through the boom return 316 and then through the distal portion 314. As shown in the solid arrows provided with the dispensing configuration 350 the agricultural solution is readily distributed along the distal portion 314 in a plurality of locations by the capillary bridges to facilitate the rapid distribution of the updated agricultural solution in a multi-dimensional manner (e.g., linear delivery along the portions 312, 314 and laterally between the 312, 314 with the capillary bridges 320.

The two examples of capillary bridges 320 previously shown in FIG. 3A are shown again in FIG. 3B in greater detail. In a first example, the left most capillary bridge 320 in this example includes an inlet port 354 associated with the proximal portion 312 and an outlet port 356 associated with the distal portion 314 of the sprayer boom tube 310. In this first example, the outlet port 356 is associated with a venturi fitting 360, for instance, having a throat profile that is constrained or minimized relative to an overall profile of the distal portion 314 (e.g., the profile of the boom tube interior). As further shown in FIG. 3B, an optional venturi valve is associated with the capillary bridge 320 and configured to throttle flow of the agricultural solution from the proximal portion 312 to the distal portion 314 to maintain the proximal portion 312 of the sprayer boom tube at a higher pressure relative to the lower or distal portion 314 and thereby facilitate continued directional toward the distal portion 314. In operation, agricultural solution in the proximal portion 312 enters the capillary bridge 320 at the inlet port 354 and is delivered at a flow rate based on the opening of the venturi valve 358. The flow of agricultural solution to the outlet port 356 is administered with the venturi fitting 360 according to the pressure differential at the Venturi fitting 360 based on the throat profile of the fitting relative to the profile of the distal portion 314 (e.g., the pressure differential draws the agricultural solution from the capillary bridge and into the distal portion 314). The agricultural solution having the updated or instant concentration, composition or the like of agricultural products is thereby readily distributed into the distal portion 314 of the sprayer boom tube 310 with the capillary bridge 320.

In some examples, the venturi valve 358 is in communication with the controller 375, and the controller 375 operates the valve 358 to change the opening of the venturi valve 358 and accordingly vary the flow rate through the capillary bridge 320. For example, the controller 375 operates the venturi valve 358 to vary the flow rate through the capillary bridge 320 based on determined (e.g., measured) and updated agricultural product concentration (as well as composition) in the distal tube portion 414.

Another example of the capillary bridge 320 previously shown in FIG. 3A is also shown in FIG. 3B. The right most capillary bridge 320 includes an inlet port 354 and an outlet port 356. In this example, the capillary bridge 320 includes a section valve 362 configured to provide pulses of agricultural solution between the proximal and distal portions 312, 314. For instance, the controller for the spraying system 300 is configured to operate the section valve 362 in one or more of an oscillating manner (e.g., as a solenoid with a duty cycle) or a prompted manner to facilitate pulsing of agricultural solution from the higher pressure proximal portion 312 across the capillary bridge 320 into the distal portion 314. Optionally, the section valve 362 is operated with a duty cycle, for instance with a solenoid, and configured to move the valve element between open and closed positions according to a specified frequency to administer the agricultural solution across the capillary bridge 320 into the distal portion 314 at a corresponding flow rate to modulate the concentration of the agricultural solution while at the same time maintaining the pressure differential and overall flow rate between the proximal portion 312 and distal portion 314 of the sprayer boom tube 310. In other examples, the capillary bridge 320 including the section valve 362 is operated on a selective basis, for instance, as the agricultural product concentration (including composition) changes. For example, the section valve 362 is, in one example, configured to operate in concert with changes in concentration (e.g., measured with a sensor or corresponding to operation of an injection pump) to accordingly distribute the newly updated agricultural solution across the capillary bridge 320 into the distal portion 314. After delivery of the agricultural solution having the updated concentration to the distal portion 314, the section valve 362 is closed to maintain the proximal and distal section pressure differential and the corresponding specified overall flow rate of the agricultural solution. In another example, the section valve 362 is closed upon detection of the updated specified concentration (or composition) change in the distal section 314, for instance with a concentration sensor local to the distal section 314.

Referring again to FIG. 3B, a recirculation configuration 352 is shown with the broken line arrows extending around the recirculation network 330 (e.g., sometimes referred to as a recirculation loop). The recirculation network 330 of the spraying system 300 includes a recirculation bridge 308 and network pump 306 associated with one or more of the sprayer boom tubes 310. The recirculation bridge 308 extends between the distal and proximal portions 314, 312 of the sprayer boom tube 310 (as well as the sprayer boom tube associated with the opposed portion of the agricultural sprayer). In the recirculation configuration 352, one or more valves such as the control valve 332 associated with the opposed sprayer boom tube 310 is closed (e.g., the right most valve in this example) to thereby prevent flow of the agricultural solution into the opposed sprayer boom tube 310. In the recirculation configuration, the network pump 306 is operated and moves the agricultural solution continuously through the recirculation network 330. For instance, the network pump 306 moves agricultural solution from the distal portion 314 of the sprayer boom tube 310 across the recirculation bridge 308 and into the proximal portion 312 of the sprayer boom tube 310 for circulation with the boom return 316. As shown in FIG. 3B, the recirculation bridge 308, in this example, is in communication with the mixer 206. Accordingly, delivery of the agricultural solution into the mixer 206 mixes (turbulates) the agricultural solution and disburses otherwise settled agricultural products into the solution. In another example, recirculation through the network 300 (e.g., through the proximal and distal portions 312, 314 disburses otherwise settled agricultural products.

As further shown in FIG. 3A, each of the main line 110 and the injection main line 304 are isolated from the recirculation network 330 by the associated check valves 305, 307. Accordingly, the recirculation of the agricultural solution is localized to the sprayer boom tubes 310 as well as the recirculation bridge 308. The agricultural solution is thereby locally recirculated and mixed within the sprayer boom tube 310 without involving remote components of the spraying system 300 including, for instance, the supply tank 116 and the agricultural product reservoirs 200A-C. Instead, the agricultural solution is localized to the sprayer boom tube 310 and mixing, for instance, with unspoiled (e.g., pure) carrier fluid is thereby prevented.

Figure 4A:
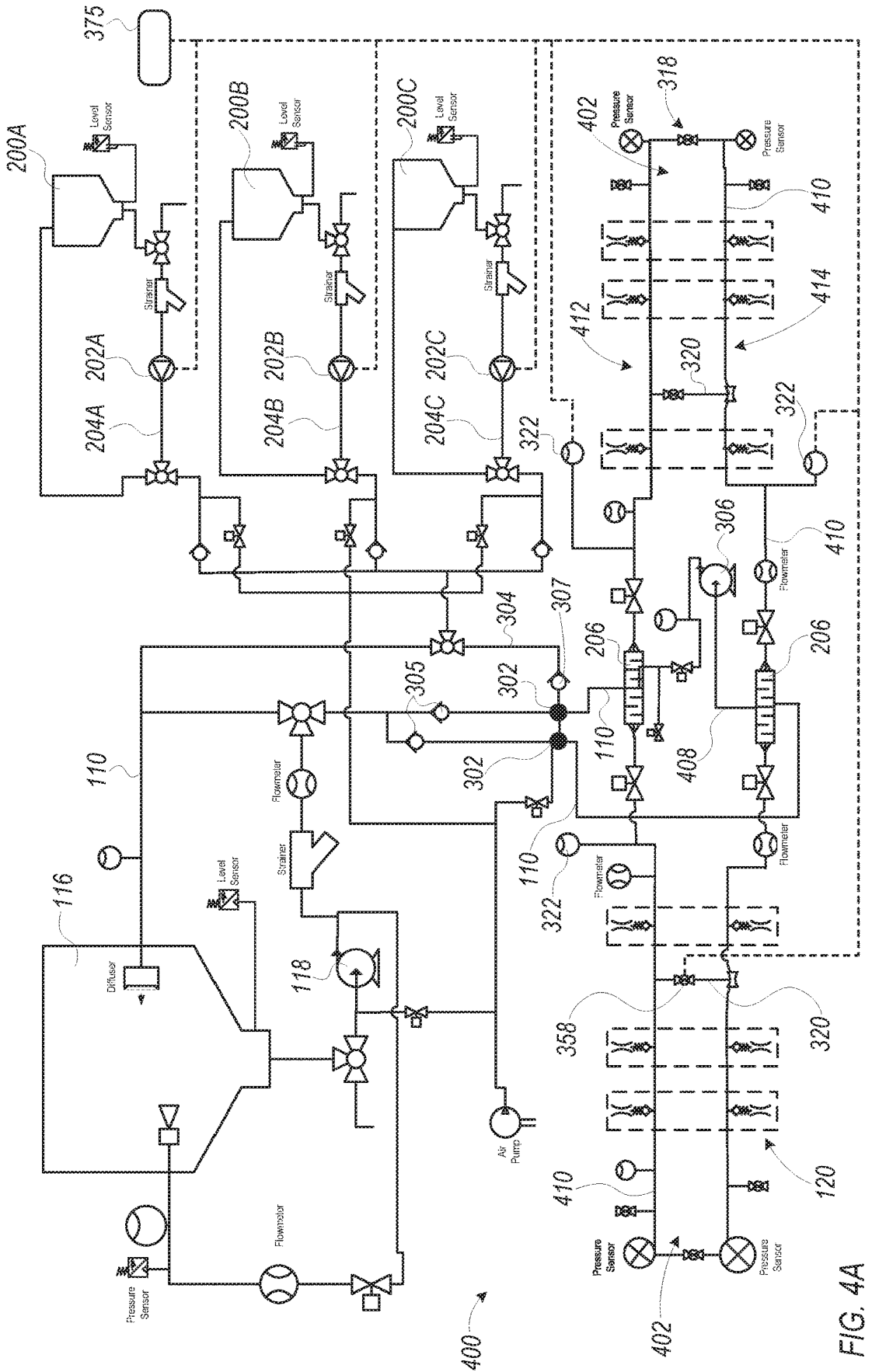
FIG. 4A is a schematic view of another example of a spraying system including capillary bridges.
Figure 4B:
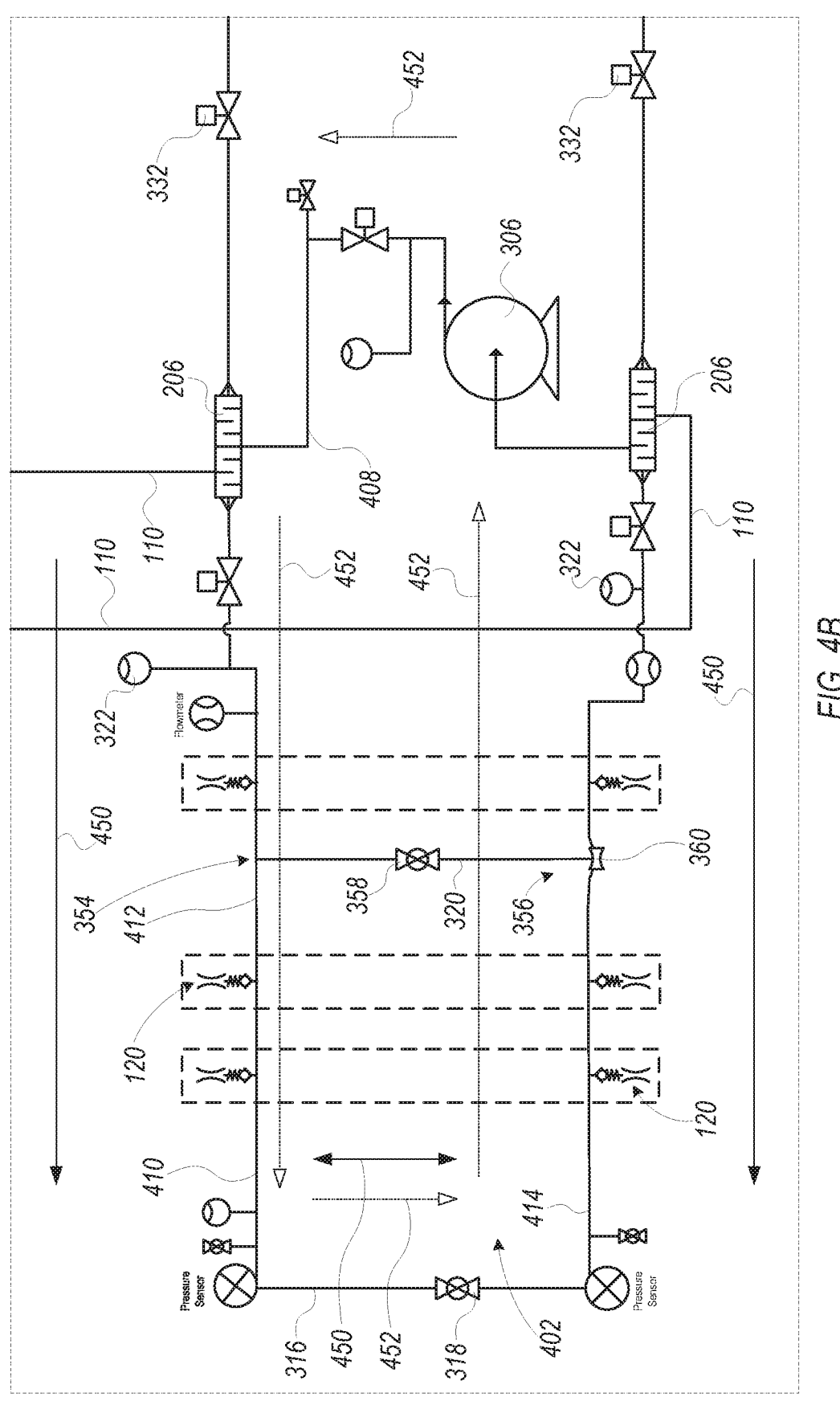
FIG. 4B is a detailed schematic view of a portion of the spraying system of FIG. 4A including a recirculation network.

FIGS. 4A and 4B are another example of a spraying system 400. The spraying system 400 includes one or more components similar in some regards to the previously described spraying system 300 shown in FIGS. 3A, B. For instance, the spraying system 400 shown in FIG. 4A includes a supply tank 116 configured to hold a carrier fluid such as water therein. One or more agricultural product reservoirs, such as the reservoirs 200A-C hold agricultural products configured for injection to the carrier fluid to vary concentration and composition to specified values. The agricultural product reservoirs 200A-C provide one or more agricultural products including, but not limited to, fertilizers, herbicides, pesticides or the like for injection to the carrier fluid (e.g., in the main line 110). As shown in FIG. 4A, each of the agricultural product reservoirs 200A-C is associated with a corresponding injection pump 202A-C. The injection pumps 202A-C are controlled to provide specified amounts of the associated agricultural products for injection to the main line 110. For example, referring to FIG. 4A, a juncture 302 is provided with the main line 110 and the injection main line 304 to merge the various agricultural products with the carrier fluid from the supply tank 116. As further shown in FIG. 4A, check valves 305 are associated with the main line 110, including the branched split main line 110 shown. Similarly, the injection main line 304 includes a check valve 307 to facilitate one way injection of the agricultural products to the carrier fluid to each of the junctures 302 for the main line 110. The check valves 305, 307 ensure recirculation in the networks described herein is localized to the sprayer boom tubes and does not include components such as the supply tank 116 or agricultural product reservoirs 200A-C.

As further shown in FIG. 4A, the spraying system 400, in this example, includes one or more concentration sensors 322, for instance, provided along one or more of the corresponding proximal or distal portions 412, 414 of the sprayer boom tubes 410. As previously described, the concentration sensors 322 are, in one example, used in combination with the injection pumps 202A-C (e.g., metering pump such as peristaltic pumps, rotary pumps, diaphragm pumps or the like) to modulate concentration (including composition) of the various agricultural products provided from the reservoirs 200A-C to the carrier fluid, for instance, at the junctures 302. In one example, the concentration sensors 322 measure the concentration of multiple agricultural products and thereby facilitate feedback control of the injection pumps 202A-C to achieve a specified prescription of concentrations, compositions or the like for the agricultural solution.

Referring again to FIG. 4A, the spraying system 400 is shown, in this example, with sprayer boom tubes 410 associated with corresponding sprayer booms 402. The sprayer booms 402 as shown in FIG. 4A, in one example, have a left and right configuration. Each of the sprayer boom tubes 410 in turn includes a proximal portion 412 and a distal portion 414. In this example, the proximal and distal portions 412, 414 are in a stacked configuration including, for instance, a plurality of product dispensers 120 associated with each of the proximal and distal portions 412, 414. Accordingly, agricultural solution, for instance, delivered from the junctures 302 along the main lines to associated mixers 206 is distributed directly to the proximal and distal portion 412, 414. With the sprayer boom tubes 410 having the stacked configuration, the main line 110 as previously described is split, for instance, proximate to the junctures 302. Accordingly, the carrier fluid and agricultural products mixed with carrier fluid (e.g., an agricultural solution) are delivered to each of the mixers 206 associated with the proximal and distal portions 412, 414 of the respective sprayer boom tubes 410. The proximal and distal portions 412, 414 include product dispensers 120 and accordingly the distributed agricultural solution is dispensed from the product dispensers 120 along each of the portions 412, 414.

As further shown in FIG. 4A, a recirculation bridge 408 is interposed between the proximal and distal portions 412, 414 of the sprayer boom tubes 410. As with the spraying system 300 previously described herein, the recirculation bridge 408 includes a network pump 306 configured to recirculate agricultural solution within one or more of the sprayer boom tubes 410 and, in some examples, provides a supplemental pressure for operation with the system pump 118.

As further shown in FIG. 4A, one or more capillary bridges 320 extend between each of the proximal and distal portion 412, 414 to provide intercommunication between the portions 412, 414. In the example shown in FIG. 4A, the capillary bridges 320 include the venturi fittings previously described and shown, for instance, in FIG. 3B. The capillary bridges 320 facilitate the shortcutting or shunting of the agricultural solution from one of the proximal portion 412 to the distal portion 414, or conversely from the distal portion 414 to the proximal portion 412. In an example, with a lower pressure flow in the distal portion 414 of the sprayer boom tubes 410, the capillary bridges 320 facilitate the delivery of updated agricultural solutions (e.g., having varied concentrations, compositions or the like) from the higher pressure proximal portion 412 to the lower pressure distal portion 414.

FIG. 4B is a detailed schematic view of a portion of the spraying system 400 previously shown and described in FIG. 4A. The portion shown in FIG. 4B includes one of the sprayer boom tubes 410 shown in FIG. 4A having a stacked configuration, for instance, including product dispensers 120 provided along each of the proximal and distal portions 412, 414. As previously described in a dispensing configuration 450 shown, for instance, with the solid arrows in FIG. 4B the agricultural solution is provided to each of the proximal and distal portions 412, 414. As shown in FIG. 4B, the main line 110 is in communication with each of the mixers 406 and the mixers 206 accordingly mix the carrier fluid along with the agricultural products provided from the one or more agricultural product reservoirs 200A-C shown in FIG. 4A. Once mixed at the respective mixers 206 the agricultural solution having the specified concentration (e.g., including composition as well as concentration) is delivered along the respective portions 412, 414 for dispensing through the product dispensers 120 such as nozzles, arrays of nozzles, boom sections and the like.

As further shown in FIG. 4B, the capillary bridge 320, in this example, bridges between the proximal and distal portions 412, 414 and accordingly provides intercommunication of the agricultural solution therebetween. In an example where one or more of the proximal or distal portions 412, 414 has a higher pressure than the opposed portion the capillary bridges 320 provide a supplemental flow of the agricultural solution including an agricultural solution having updated concentrations to the portion 412, 414 at the lower pressure. In this example, the proximal portion 412 is configured for operation at a first higher pressure relative to the distal portion 414 of the sprayer boom tube 410. Accordingly, the capillary bridge 320 facilitates the delivery of updated agricultural solution across the bridge 320 into the distal portion 414 of the boom tube 410, for instance, through the venturi fitting 360.

As further shown in FIG. 4B, each of the proximal and distal portions 412, 414 of the sprayer boom 410, in this example, include respective concentration sensors 322. As previously described, the concentration sensors 322 are in communication with a controller. One or more of concentration and composition measurements are conducted with the concentration sensors 322 and the controller operates the associated injection pumps 202A-C associated with the agricultural products of the reservoirs 200A-C, for instance to provide specified concentrations of one or more agricultural products for the agricultural solution. Accordingly, as the concentration is changed, the concentration sensors 322 detect the instant concentration (including composition, in some examples) of one or more agricultural products in the agricultural solution and the injection pumps 202A-C are operated to control (e.g., increase, decrease or maintain) the flow rate of the agricultural product to achieve the specified concentration or concentrations of the agricultural products in the agricultural solution.

As further shown in FIG. 4B, a recirculation configuration 452 is illustrated with broken arrows for the recirculation network 430 including the sprayer boom tube and the recirculation bridge 408. In the recirculation configuration 452, one or more of the sprayer boom tubes 410 is isolated relative to an opposed sprayer boom tube. For instance, the control valves 332 associated with the opposed sprayer boom tube 410 shown on the right portion of FIG. 4A are closed thereby isolating the sprayer boom tube 410 shown in FIG. 4B. Additionally, because check valves 305 are provided along each of the branches of the main line 110 and along the injection main line 304 in the recirculation configuration 452 the sprayer boom tube 410 is isolated from the remainder of the spraying system 400. As shown in FIG. 4B, the recirculation bridge 408, including the network pump 306, is operated to circulate the agricultural solution in a continuous loop through the recirculation network 430. For instance, the network pump 306 pumps the agricultural solution into the mixer 206 and from the mixer the solution is delivered along the proximal and distal portions 412 of the sprayer boom tube 410. The agricultural solution is delivered toward the mixer 206 associated with the distal portion 414 and then cycled again through the network pump 306. The recirculation configuration 452 facilitates the localized mixing of the resident agricultural solution within the sprayer boom tube 410 and distribute agricultural products otherwise settled out of the agricultural solution. Additionally, the isolated recirculation network 430 in the recirculation configuration 452 substantially localizes the recirculation movement to the sprayer boom tube 410 and the recirculation bridge 408 and thereby isolates the remainder of the spraying system 400 such as the supply tank 116 and the one or more agricultural product reservoirs 200A-C from the mixed resident solution within the boom tube 410.

In another example, the recirculation network 430 of the spraying system 400 is operated in the recirculation configuration 452 with one or more of the product dispensers 120 in an open configuration. In this example, the recirculation of a fluid, such as water or other cleaning fluid, through the recirculation network 430 rinses and removes residue from the sprayer boom tube 410 including the proximal and distal portions 412, 414 as well as from the product dispensers 120 including, for instance, a plurality of nozzles.

Figure 5A:
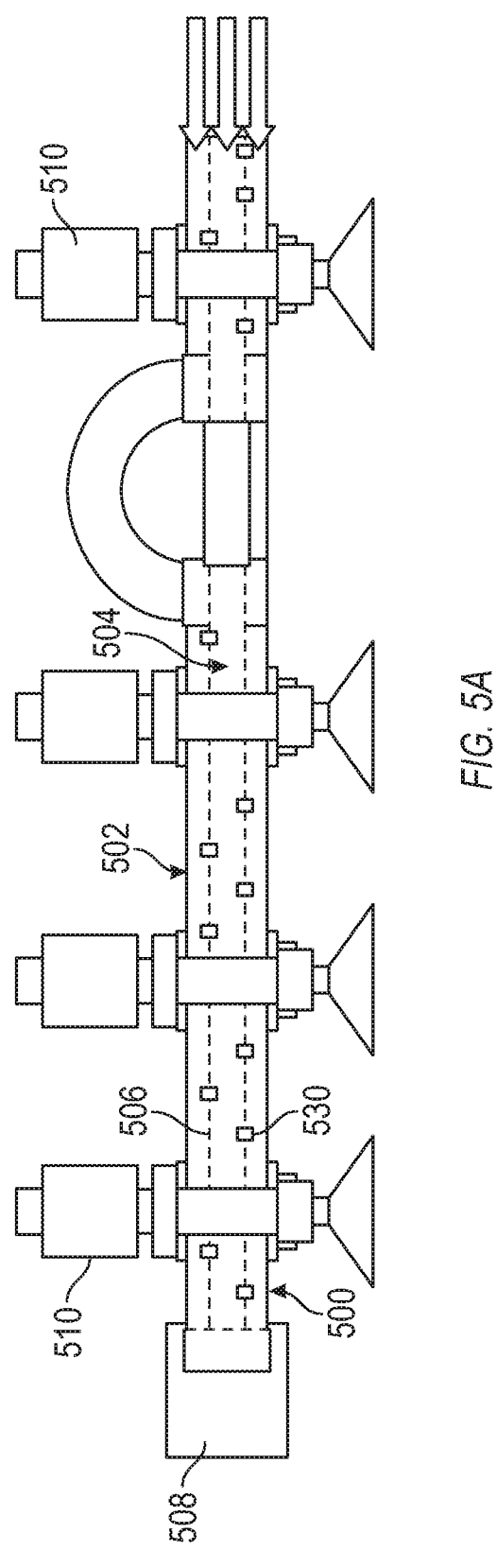
FIG. 5A is a cross sectional view of one example of a sprayer boom tube including nested flow passages in a dispensing configuration.

FIGS. 5A-6B show one example of a sprayer boom tube 500 including a nested configuration of exterior and interior flow passages 502, 504. Referring first to FIGS. 5A, B the sprayer boom tube 500 is shown in a dispensing configuration. In this example, agricultural solution is delivered through each of the flow passages 502, 504 (as shown with arrows). In another example, the agricultural solution is delivered linearly, for example, initially through the interior flow passage 504 and redirected through with a boom return 508. In still another example, the agricultural solution is first delivered by way of the exterior flow passage 502 and, after passing through the boom return 508 is delivered through the interior flow passage 504.

Figure 5B:
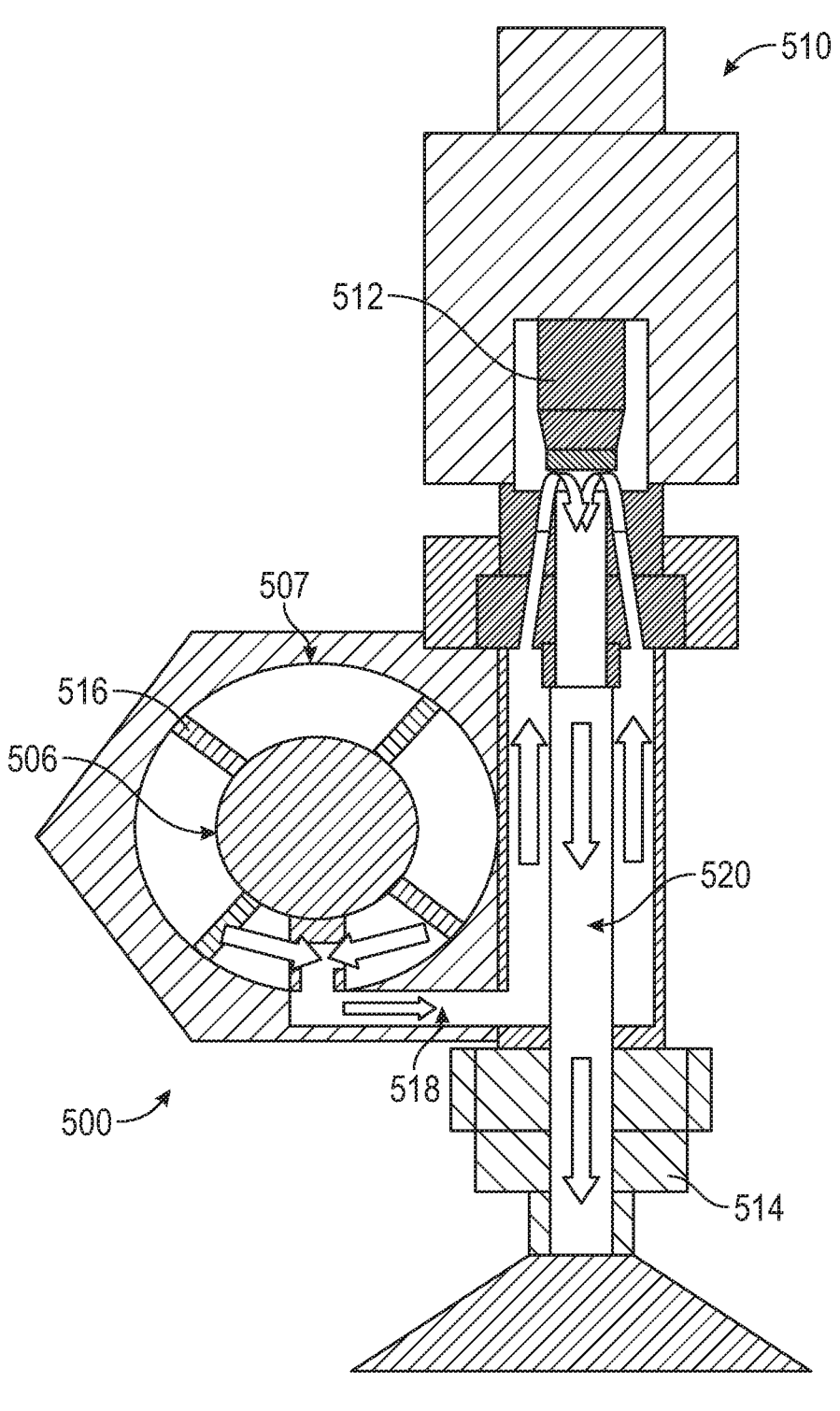
FIG. 5B is another cross sectional view of the sprayer boom tube of FIG. 5A and an example product dispenser.

Referring to FIG. 5B, the exterior and interior flow passages 502, 504 are shown in an example nested configuration with the interior flow passage 504 separated from the exterior flow passage 502 by a septum wall 506, for instance the wall of a tube forming the interior flow passage 504. One or more support struts 516 extend between the septum wall 506 and the tube wall 507 (e.g., of the sprayer boom tube 500) and position the interior flow passage 504, in this example centrally. The support struts 516 are configured, in some examples, to mix the agricultural solution in one or both of the dispensing or recirculation configurations. For example, the support struts 516 are staggered, include surface contours, fins, roughening or the like configured to mix (e.g., turbulate) the agricultural solution.

As further shown in FIG. 5B, an example product dispenser (e.g., a nozzle assembly) is coupled with the sprayer boom tube 500. A dispenser inlet port 518 is in communication with the one or more of the passages 502, 504, and in this example is in communication with the exterior flow passage 502. The dispenser inlet port extends to a control valve 512, such as a solenoid control valve. The control valve 512 is optionally operated according to one or more specified duty cycles to provide corresponding flow rates of the agricultural solution. A dispenser outlet port 520 extends form the control valve 512 to a nozzle head 514. As shown in FIG. 5B the control valve 512 is open and the flow of agricultural solution from the exterior flow passage 502 and the dispenser inlet port 518 is delivered through the dispenser outlet port 520 through the nozzle head 514.

In another example, the sprayer boom tube 500 includes one or more capillary bridges 530 configured to pass agricultural solution (e.g., having updated concentrations, compositions or the like) between the exterior and interior flow passages 502, 504. The capillary bridges 530 in this example are ports extending between the passages 502, 504. As previously described the capillary bridges 530 short circuit or shunt communication between the exterior and interior passages 502, 504 and allow for a shortened delivery path therebetween and rapid mixing of updated agricultural solutions with previously delivered agricultural solutions. In a dispensing configuration with the initial flow delivered through the interior flow passage 504, the capillary bridges 530 allow for deliver of the agricultural solution from the higher pressure interior flow passage 504 to the lower pressure exterior flow passage 502. In a converse arrangement, the capillary bridges 530 facilitate inverse transmission between the exterior and interior flow passages 502, 504. Optionally, the capillary bridges 530 provide another feature for mixing the agricultural solution and one or more agricultural products, for instance by mixing the carrier fluid and products by way of passage through the bridges 530 and disturbances of the laminar flow in the passages 502, 504 (e.g., by the incoming flow from the bridges 530).

Figure 6A:
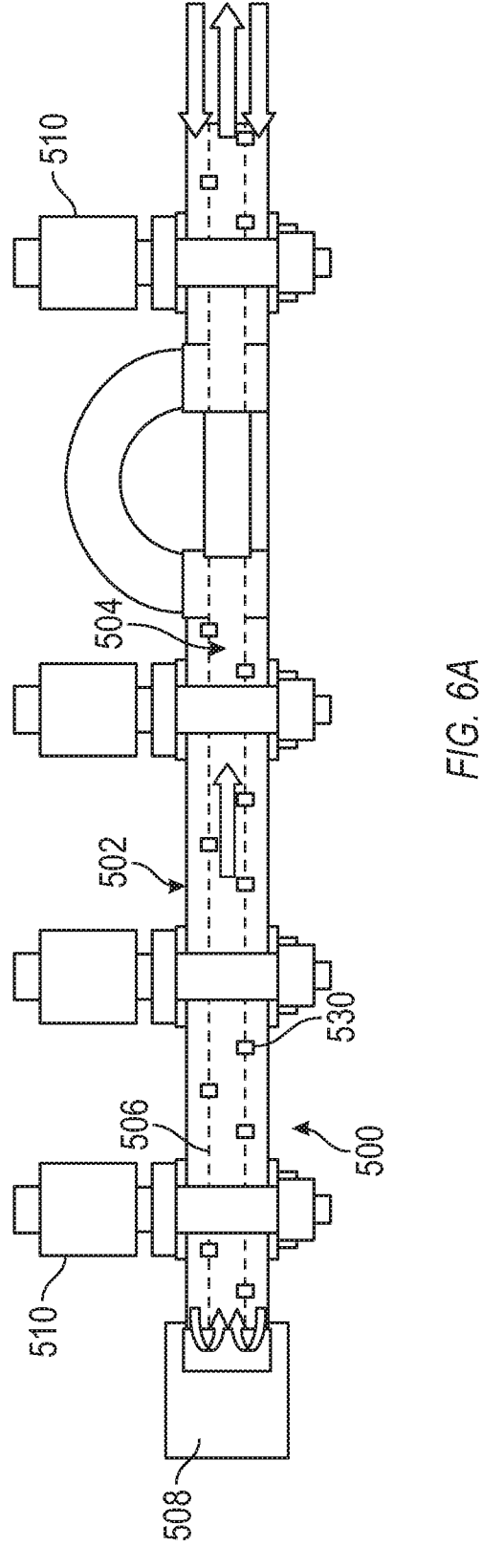
FIG. 6A is a cross sectional view of the sprayer boom tube of FIG. 5A in a recirculating configuration.
Figure 6B:
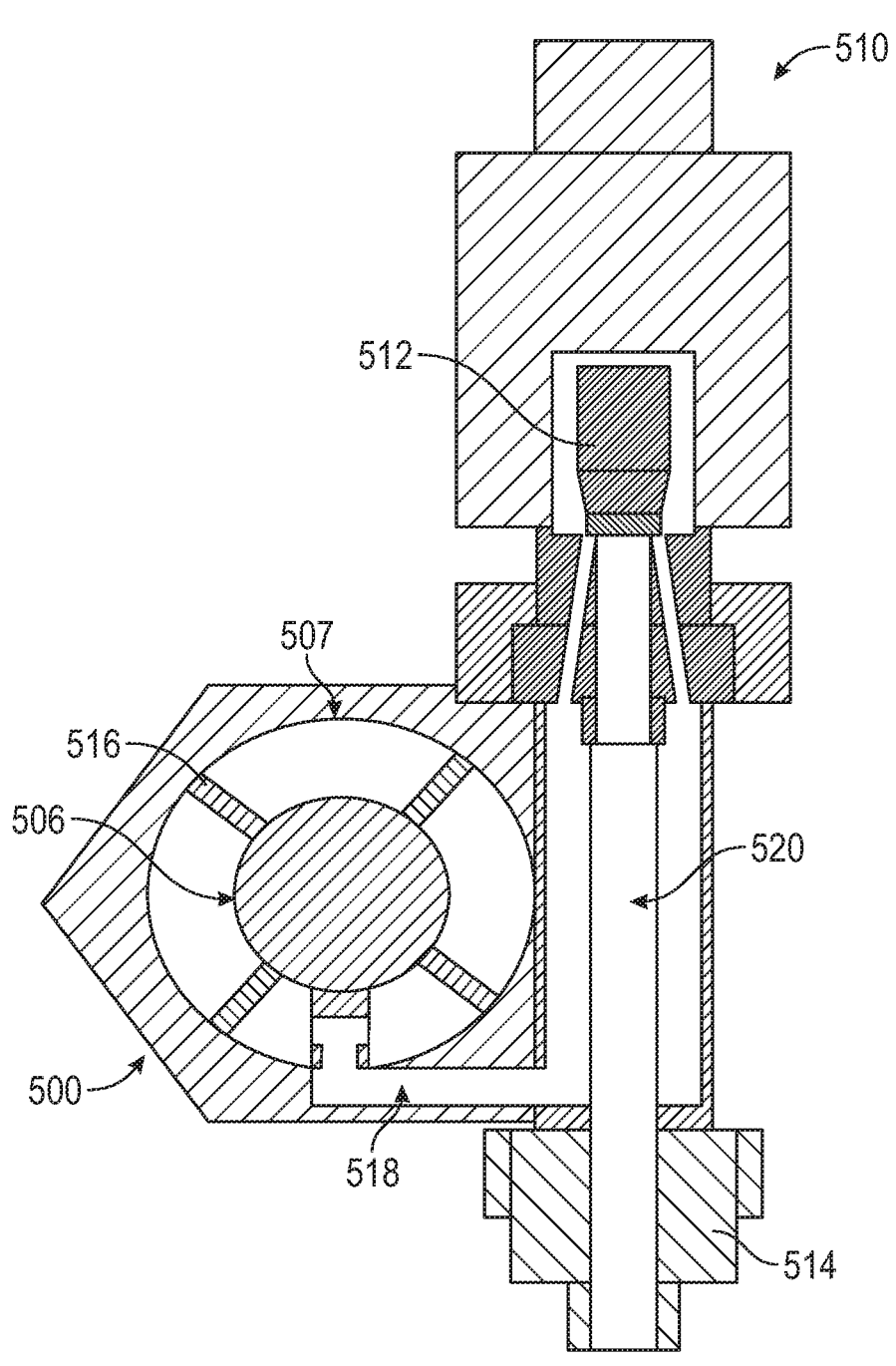
FIG. 6B is another cross sectional view of the sprayer boom tube of FIG. 6B.

FIGS. 6A, B show the sprayer boom tube 500 in a recirculation configuration. The agricultural solution is circulated through the sprayer boom tube 500, for instance with incoming flow delivered through the interior flow passage 504 and outgoing flow passing through the exterior flow passage 502. In this configuration, product dispensers 510 and the associated control valves 512 are optionally closed to facilitate circulation of the fluid. In another example, the control valves 512 remain open, for instance to pass cleaning solution (e.g., water) through the nozzle head 514 to remove residue from previously used agricultural solutions.

In a similar manner to the recirculation networks previously described herein the sprayer boom tube 500 allows for localized recirculation of the agricultural solutions resident in the boom tube 500. Other portions of the spraying system, including remote portions, such as supply tanks, agricultural product reservoirs or the like are isolated from the recirculation network including the sprayer boom tube 500 and the recirculating agricultural solution. In one example the exterior and interior flow passages 502, 504 are in communication with a circulation bridge, such as the bridge 408 and a network pump 306 as shown in FIGS. 4A, B to conduct recirculation within the recirculation network including the passages 502, 504 of the sprayer boom tube 500.

Figure 7:
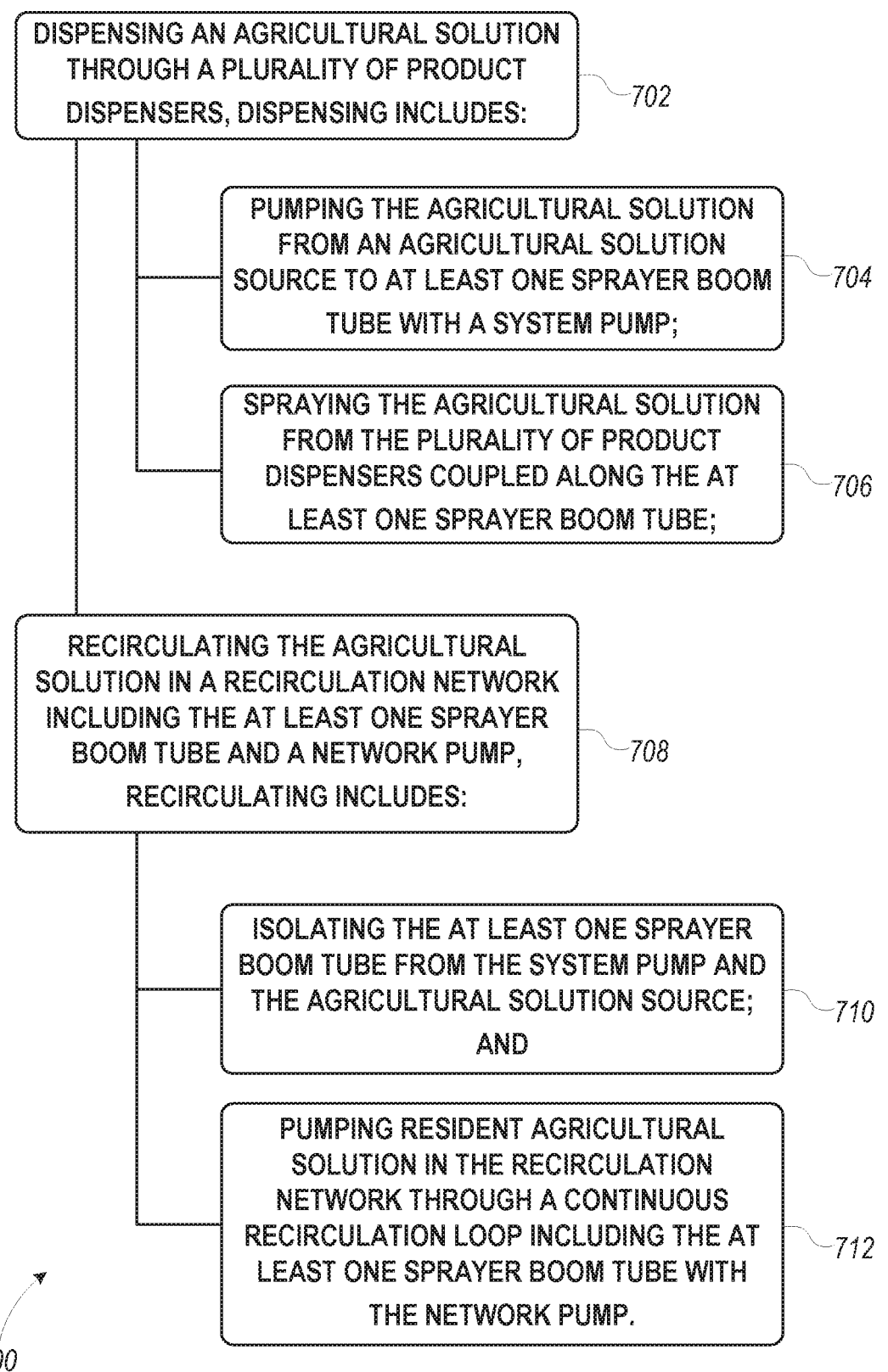
FIG. 7 is a block diagram illustrating one example of a method for operating a product dispensing system.

FIG. 7 is a block diagram illustrating one example of a method 700 for operating a product dispensing system, including one or more of the product dispensing system described herein. In describing the method 700, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described in the method 700 include, but are not limited to, the corresponding numbered elements provided herein and other corresponding elements described herein (both numbered and unnumbered) as well as their equivalents.

At 702, an agricultural solution is dispensed through a plurality of product dispensers. For example, the method 700 includes at 704 pumping the agricultural solution from an agricultural solution source to at least one spray boom tube. For instance, the agricultural solution is pumped by a system pump to the spray boom. In some examples, the agricultural solution is pumped with the system pump and a network pump.

In an example, the agricultural solution is linearly delivered through the sprayer boom tube, for instance to the product dispensers. Optionally, the agricultural solution is laterally delivered across one or more capillary bridges spanning portions of the sprayer boom tube. For instance, agricultural solution having a first agricultural product concentration is mixed with agricultural solution having a second agricultural product concentration. At 706, the agricultural solution is sprayed from the product dispensers.

At 708, the method 700 includes recirculating the agricultural solution in a recirculation network. The recirculation network includes the sprayer boom tube and a network pump. At 710 the sprayer boom tube is isolated from the system pump and the agricultural solution source. In an example, at 712 agricultural solution that is resident in the recirculation network is pumped through a continuous recirculation loop. For instance, agricultural solution present in the recirculation network is pumped upon isolating the at least one sprayer boom tube. In an example, the continuous recirculation loop includes the sprayer boom tube with the network pump.

Several options for the method 700 follow. In an example, an idle condition (e.g., of a prime mover) includes one or more of a vehicle stopped condition, a vehicle turning condition or an interrupted spraying condition. The agricultural solution is optionally recirculated in the idle condition.

Various Notes and Aspects

Aspect 1 includes subject matter such as a product dispensing system comprising: at least one recirculation network configured for communication with a system pump, the at least one recirculation network is downstream from the system pump, the at least one recirculation network includes: at least one sprayer boom tube extending between a proximal portion and an distal portion; and a network pump in communication with the at least one sprayer boom tube; a plurality of product dispensers distributed along the at least one sprayer boom tube; and wherein the at least one recirculation network includes a dispensing configuration and a recirculation configuration: in the dispensing configuration the recirculation network and the plurality of product dispensers are configured for communication with a supply tank and an agricultural product reservoir; and in the recirculation configuration the recirculation network is isolated from the supply tank and the agricultural product reservoir, and the recirculation network includes a recirculation loop continuously extending through the at least one sprayer boom tube and the network pump.

Aspect 2 can include, or can optionally be combined with the subject matter of Aspect 1, to optionally include wherein the recirculation loop is proximate to the at least one sprayer boom tube and remote from the supply tank and the agricultural product reservoir.

Aspect 3 can include, or can optionally be combined with the subject matter of one or any combination of Aspects 1 or 2 to optionally include wherein the at least one sprayer boom tube is coupled with a sprayer boom of an agricultural sprayer.

Aspect 4 can include, or can optionally be combined with the subject matter of one or any combination of Aspects 1-3 to optionally include the agricultural sprayer and the sprayer boom.

Aspect 5 can include, or can optionally be combined with the subject matter of one or any combination of Aspects 1-4 to optionally include wherein the at least one sprayer boom tube includes first and second sprayer boom tubes, and each of the first and second sprayer boom tubes extends between proximal portions and distal portions, respectively.

Aspect 6 can include, or can optionally be combined with the subject matter of Aspects 1-5 to optionally include wherein the first and second sprayer boom tubes are coupled in a stacked configuration and configured for coupling along a sprayer boom.

Aspect 7 can include, or can optionally be combined with the subject matter of Aspects 1-6 to optionally include wherein in the dispensing configuration the first and second boom tubes are isolated from each other with an isolation valve, and in the recirculation configuration the isolation valve is open and the recirculation loop includes the first and second sprayer boom tubes in communication.

Aspect 8 can include, or can optionally be combined with the subject matter of Aspects 1-7 to optionally include wherein the at least one recirculation network includes: a boom return interconnecting ends of the proximal and distal portions of the at least one sprayer boom tube; one or more capillary bridges spanning between the proximal and distal portions of the at least one sprayer boom tube, the one or more capillary bridges interconnect the proximal and distal portions of the at least one sprayer boom tube; and a length of the capillary bridges is shorter than a length of the sprayer boom tube between proximal and distal portions.

Aspect 9 can include, or can optionally be combined with the subject matter of Aspects 1-8 to optionally include wherein the one or more capillary bridges includes an array of capillary bridges spanning between the proximal and distal portions of the at least one sprayer boom tube.

Aspect 10 can include, or can optionally be combined with the subject matter of Aspects 1-9 to optionally include wherein the one or more capillary bridges each include: an inlet port in communication with the proximal portion of the at least one sprayer boom tube; an outlet port in communication with the distal portion of the at least one sprayer boom tube; and the capillary bridge extends between the inlet and outlet ports.

Aspect 11 can include, or can optionally be combined with the subject matter of Aspects 1-10 to optionally include wherein the capillary bridge includes a capillary tube.

Aspect 12 can include, or can optionally be combined with the subject matter of Aspects 1-11 to optionally include wherein the capillary bridge includes a venturi fitting, the venturi fitting includes: a throat having a throat profile smaller than a boom tube profile of the at least one sprayer boom tube; and the outlet port proximate to the throat and in communication with the throat.

Aspect 13 can include, or can optionally be combined with the subject matter of Aspects 1-12 to optionally include the supply tank configured to store a carrier fluid; the agricultural product reservoir configured to store an agricultural product; a system pump in communication with each of the supply tank and the agricultural product reservoir, the system pump is configured to pump a mixture of the carrier fluid and the agricultural product to the at least one sprayer boom tube.

Aspect 14 can include, or can optionally be combined with the subject matter of Aspects 1-13 to optionally include wherein the at least one sprayer boom tube includes: an exterior flow passage; an interior flow passage within the exterior flow passage: a septum wall therebetween; and wherein the plurality of product dispensers are each in communication with at least one of the exterior or interior flow passages.

Aspect 15 can include, or can optionally be combined with the subject matter of Aspects 1-14 to optionally include wherein one or more support struts extend between the septum wall and a tube wall surrounding the exterior flow passage.

Aspect 16 can include, or can optionally be combined with the subject matter of Aspects 1-15 to optionally include wherein the one or more support struts are configured to mix an agricultural solution including a carrier fluid and an agricultural product in each of the dispensing and recirculation configurations.

Aspect 17 can include, or can optionally be combined with the subject matter of Aspects 1-16 to optionally include wherein one or more capillary bridges span between the exterior and interior flow passages, and the one or more capillary bridges interconnect the exterior and interior flow passages.

Aspect 18 can include, or can optionally be combined with the subject matter of Aspects 1-17 to optionally include a product dispensing system comprising: at least one sprayer boom tube extending between a proximal portion and a distal portion, the proximal portion configured for communication with a source of agricultural solution; a plurality of product dispensers distributed along the at least one sprayer boom tube; and a distribution array coupled between the proximal portion and the distal portion of the at least one sprayer boom tube, the distribution array includes: one or more capillary bridges spanning the proximal and distal portions, the one or more capillary bridges interconnect the proximal and distal portions of the at least one sprayer boom tube; and a length of the one or more capillary bridges is shorter than a length of the sprayer boom tube between the proximal and distal portions.

Aspect 19 can include, or can optionally be combined with the subject matter of Aspects 1-18 to optionally include wherein the source of agricultural solution includes a supply tank for carrier fluid and an agricultural product reservoir.

Aspect 20 can include, or can optionally be combined with the subject matter of Aspects 1-19 to optionally include wherein the one or more capillary bridges includes at least first and second capillary bridges: the first capillary bridge spanning the proximal and distal portions at a first proximal location and a first distal location; and the second capillary bridge spanning the proximal and distal portions at a second proximal and distal locations different than the first proximal and distal locations.

Aspect 21 can include, or can optionally be combined with the subject matter of Aspects 1-20 to optionally include wherein the distribution array including the one or more capillary bridges includes an array of capillary bridges spanning between the proximal and opposed distal portions of the at least one sprayer boom tube.

Aspect 22 can include, or can optionally be combined with the subject matter of Aspects 1-21 to optionally include wherein the at least one sprayer boom tube includes a boom return interconnecting respective ends of the proximal and distal portions of the at least one sprayer boom tube.

Aspect 23 can include, or can optionally be combined with the subject matter of Aspects 1-22 to optionally include wherein the one or more capillary bridges each includes a capillary tube.

Aspect 24 can include, or can optionally be combined with the subject matter of Aspects 1-23 to optionally include wherein the one or more capillary bridges each include: an inlet port in communication with the proximal of the at least one sprayer boom tube; an outlet port in communication with the distal portion of the at least one sprayer boom tube; and the capillary bridge extends between the inlet and outlet ports.

Aspect 25 can include, or can optionally be combined with the subject matter of Aspects 1-24 to optionally include wherein the capillary bridge includes a venturi fitting, the venturi fitting includes: a throat having a throat profile smaller than a boom tube profile of the at least one sprayer boom tube; and the outlet port proximate to the throat and in communication with the throat.

Aspect 26 can include, or can optionally be combined with the subject matter of Aspects 1-25 to optionally include wherein the at least one sprayer boom tube includes the plurality of product dispensers distributed along each of the proximal and distal portions.

Aspect 27 can include, or can optionally be combined with the subject matter of Aspects 1-26 to optionally include a method for operating a product dispensing system comprising: dispensing an agricultural solution through a plurality of product dispensers, dispensing includes: pumping the agricultural solution from an agricultural solution source to at least one sprayer boom tube with a system pump: spraying the agricultural solution from the plurality of product dispensers coupled along the at least one sprayer boom tube; and recirculating the agricultural solution in a recirculation network including the at least one sprayer boom tube and a network pump, recirculating includes: isolating the at least one sprayer boom tube from the system pump and the agricultural solution source; and pumping resident agricultural solution in the recirculation network through a continuous recirculation loop including the at least one sprayer boom tube with the network pump.

Aspect 28 can include, or can optionally be combined with the subject matter of Aspects 1-27 to optionally include wherein pumping the resident agricultural solution includes pumping agricultural solution present in the recirculation network upon isolating the at least one sprayer boom tube.

Aspect 29 can include, or can optionally be combined with the subject matter of Aspects 1-28 to optionally include wherein pumping the agricultural solution to the at least one sprayer boom tube with the system pump includes pumping the agricultural solution with the system pump and the network pump.

Aspect 30 can include, or can optionally be combined with the subject matter of Aspects 1-29 to optionally include, wherein an idle condition includes one or more of a vehicle stopped condition, a vehicle turning condition or an interrupted spraying condition, and recirculating the agricultural solution includes recirculating in the idle condition.

Aspect 31 can include, or can optionally be combined with the subject matter of Aspects 1-30 to optionally include wherein dispensing the agricultural solution includes: linearly delivering the agricultural solution through the at least one sprayer boom tube, and laterally delivering the agricultural solution across one or more capillary bridges spanning portions of the at least one sprayer boom tube.

Aspect 32 can include, or can optionally be combined with the subject matter of Aspects 1-31 to optionally include wherein laterally delivery the agricultural solution across the one or more capillary bridges includes mixing the agricultural solution having a first agricultural product concentration with the agricultural solution having a second agricultural product concentration.

Each of these non-limiting examples can stand on its own, or can be combined in various permutations or combinations with one or more of the other examples.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular". "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A product dispensing system comprising:
at least one recirculation network configured for communication with a system pump, the at least one recirculation network is downstream from the system pump, the at least one recirculation network includes:
at least one sprayer boom tube extending between a proximal portion and a distal portion; and
a network pump in communication with the at least one sprayer boom tube;
a plurality of product dispensers distributed along the at least one sprayer boom tube; and
wherein the at least one recirculation network includes a dispensing configuration and a recirculation configuration:
in the dispensing configuration the recirculation network and the plurality of product dispensers are configured for communication with a supply tank and an agricultural product reservoir; and
in the recirculation configuration the recirculation network is isolated from the supply tank and the agricultural product reservoir, and the recirculation network includes a recirculation loop continuously extending through the at least one sprayer boom tube and the network pump, and wherein agricultural product fluid is configured to flow through the recirculation loop in the recirculation configuration.

2. The product dispensing system of claim 1, wherein the recirculation loop is proximate to the at least one sprayer boom tube and remote from the supply tank and the agricultural product reservoir.

3. The product dispensing system of claim 1, wherein the at least one sprayer boom tube is coupled with a sprayer boom of an agricultural sprayer.

4. The product dispensing system of claim 3 comprising the agricultural sprayer and the sprayer boom.

5. The product dispensing system of claim 1, wherein the at least one sprayer boom tube includes first and second sprayer boom tubes, and each of the first and second sprayer boom tubes extends between proximal portions and distal portions, respectively.

6. The product dispensing system of claim 5, wherein the first and second sprayer boom tubes are coupled in a stacked configuration and configured for coupling along a sprayer boom.

7. The product dispensing system of claim 5, wherein in the dispensing configuration the first and second boom tubes are isolated from each other with an isolation valve, and in the recirculation configuration the isolation valve is open and the recirculation loop includes the first and second sprayer boom tubes in communication.

8. The product dispensing system of claim 1, wherein the at least one recirculation network includes:
 a boom return interconnecting ends of the proximal and distal portions of the at least one sprayer boom tube;
 one or more capillary bridges spanning between the proximal and distal portions of the at least one sprayer boom tube, the one or more capillary bridges interconnect the proximal and distal portions of the at least one sprayer boom tube; and
 a length of the capillary bridges is shorter than a length of the sprayer boom tube between proximal and distal portions.

9. The product dispensing system of claim 8, wherein the one or more capillary bridges includes an array of capillary bridges spanning between the proximal and distal portions of the at least one sprayer boom tube.

10. The product dispensing system of claim 8, wherein the one or more capillary bridges each include:
 an inlet port in communication with the proximal portion of the at least one sprayer boom tube;
 an outlet port in communication with the distal portion of the at least one sprayer boom tube; and
 the capillary bridge extends between the inlet and outlet ports.

11. The product dispensing system of claim 10, wherein the capillary bridge includes a capillary tube.

12. The product dispensing system of claim 10, wherein the capillary bridge includes a venturi fitting, the venturi fitting includes:
 a throat having a throat profile smaller than a boom tube profile of the at least one sprayer boom tube; and
 the outlet port proximate to the throat and in communication with the throat.

13. The product dispensing system of claim 1 comprising the supply tank configured to store a carrier fluid;
 the agricultural product reservoir configured to store an agricultural product;
 the system pump in communication with each of the supply tank and the agricultural product reservoir, the system pump is configured to pump a mixture of the carrier fluid and the agricultural product to the at least one sprayer boom tube.

14. The product dispensing system of claim 1, wherein the at least one sprayer boom tube includes:
 an exterior flow passage;
 an interior flow passage within the exterior flow passage;
 a septum wall therebetween; and wherein the plurality of product dispensers are each in communication with at least one of the exterior or interior flow passages.

15. The product dispensing system of claim 14, wherein one or more support struts extend between the septum wall and a tube wall surrounding the exterior flow passage.

16. The product dispensing system of claim 15, wherein the one or more support struts are configured to mix an agricultural solution including a carrier fluid and an agricultural product in each of the dispensing and recirculation configurations.

17. The product dispensing system of claim 14, wherein one or more capillary bridges span between the exterior and interior flow passages, and the one or more capillary bridges interconnect the exterior and interior flow passage.

18. The product dispensing system of claim 1, wherein the network pump is in fluid communication along the sprayer boom tube.

19. A method for operating a product dispensing system comprising:
 dispensing an agricultural solution through a plurality of product dispensers, in a dispensing configuration, dispensing includes:
  pumping the agricultural solution from an agricultural solution source including a supply tank and an agricultural product reservoir to at least one sprayer boom tube with a system pump; and
  spraying the agricultural solution from the plurality of product dispensers coupled along the at least one sprayer boom tube; and
 recirculating the agricultural solution in a recirculation network including the at least one sprayer boom tube and a network pump, in a recirculation configuration, recirculating includes:
  isolating the at least one sprayer boom tube from the system pump and the agricultural solution source; and
  pumping resident agricultural solution in the recirculation network through a continuous recirculation loop including the at least one sprayer boom tube with the network pump while the system pump and the agricultural solution source are isolated from the resident agricultural solution.

20. The method of claim 19, wherein pumping the resident agricultural solution includes pumping agricultural solution present in the recirculation network upon isolating the at least one sprayer boom tube.

21. The method of claim 19, wherein pumping the agricultural solution to the at least one sprayer boom tube with the system pump includes pumping the agricultural solution with the system pump and the network pump.

22. The method of claim 19, wherein an idle condition includes one or more of a vehicle stopped condition, a vehicle turning condition or an interrupted spraying condition, and recirculating the agricultural solution includes recirculating in the idle condition.

23. The method of claim 19, wherein dispensing the agricultural solution includes:
 linearly delivering the agricultural solution through the at least one sprayer boom tube, and laterally delivering the agricultural solution across one or more capillary bridges spanning portions of the at least one sprayer boom tube.

24. The method of claim 23, wherein laterally delivering the agricultural solution across the one or more capillary bridges includes mixing the agricultural solution having a first agricultural product concentration with the agricultural solution having a second agricultural product concentration.

25. The method of claim 19, wherein the network pump is in fluid communication along the sprayer boom tube.

\* \* \* \* \*